US012737158B2

(12) United States Patent
Girdhar

(10) Patent No.: US 12,737,158 B2
(45) Date of Patent: Sep. 15, 2026

(54) AUTOMATED NO-CODE CODING OF APP-SOFTWARE USING A CONVERSATIONAL INTERFACE AND NATURAL LANGUAGE PROCESSING

(71) Applicant: APPY PIE LLP, New Delhi (IN)

(72) Inventor: Abhinav Girdhar, New Delhi (IN)

(73) Assignee: APPY PIE LLP, New Delhi (IN)

( * ) Notice: Subject to any disclaimer, the term of this patent is extended or adjusted under 35 U.S.C. 154(b) by 256 days.

(21) Appl. No.: 18/567,850

(22) PCT Filed: Jun. 7, 2021

(86) PCT No.: PCT/IB2021/000388

§ 371 (c)(1),
(2) Date: Dec. 7, 2023

(87) PCT Pub. No.: WO2022/259005

PCT Pub. Date: Dec. 15, 2022

(65) Prior Publication Data

US 2024/0272877 A1 Aug. 15, 2024

(51) Int. Cl.
*G06F 8/33* (2018.01)

(52) U.S. Cl.
CPC .................................... *G06F 8/33* (2013.01)

(58) Field of Classification Search
CPC ...................................................... G06F 8/33
See application file for complete search history.

(56) References Cited

U.S. PATENT DOCUMENTS 10,515,121 B1 12/2019 Setlur et al.
11,113,034 B2 * 9/2021 Singh .................. G06F 11/3438
11,163,960 B2 * 11/2021 Saha ..................... G06F 40/295
11,538,470 B2 * 12/2022 Kim ..................... G10L 15/1815
11,614,922 B2 * 3/2023 Brown .................... G06F 8/315
717/109
11,870,741 B2 * 1/2024 John ....................... H04L 67/51
11,922,143 B1 * 3/2024 Shapiro ..................... G06F 8/34
12,079,584 B2 * 9/2024 Dua .......................... G06F 8/35
2008/0046238 A1 2/2008 Orcutt (Continued)

FOREIGN PATENT DOCUMENTS

KR 20180093556 A * 8/2018 ............... G06F 8/33
KR 102027141 B1 * 11/2019 ............ G06F 3/167

(Continued)

OTHER PUBLICATIONS

KR-20180093556-A English Translation.*

(Continued)

*Primary Examiner* — Francisco J Aponte
(74) *Attorney, Agent, or Firm* — Duane Morris LLP

(57) ABSTRACT

The present disclosure relates to a new and useful platform and system for the automated no-code coding of software Apps and other software using conversational interface based on Natural Language Understanding (NLU) or the associated National Language Processing (NLP) and method of operation and use thereof, more specifically a new platform and system either as a website or even as a stand-alone App-based software with a Natural Language Engine (NLE) for user entry to further power portions or the entire editing of no-code Apps using NLU/NLP and method of use thereof.

10 Claims, 19 Drawing Sheets

(56) References Cited

U.S. PATENT DOCUMENTS

2012/0198418 A1 8/2012 Agarwal et al.
2018/0107461 A1* 4/2018 Balasubramanian ..... G06F 8/38
2018/0219921 A1* 8/2018 Baer ..................... H04L 51/046
2019/0004791 A1* 1/2019 Brebner .................... G06F 8/76
2019/0036989 A1* 1/2019 Eirinberg ................ H04L 67/34
2019/0073197 A1* 3/2019 Collins ..................... G06F 8/60
2019/0385005 A1 12/2019 Yang
2019/0394150 A1* 12/2019 Denoue ................ G06Q 10/101
2020/0301678 A1* 9/2020 Burman .................. G06F 9/541
2021/0042094 A1* 2/2021 Burman .................... G06F 8/34
2021/0044546 A1* 2/2021 Taslimi ............... G10L 15/1822
2021/0334092 A1* 10/2021 Das ......................... H04L 67/34
2021/0337249 A1* 10/2021 Jain ........................... G06F 8/33
2022/0060435 A1* 2/2022 Whitten .................... G06F 8/38
2022/0244925 A1* 8/2022 Moss .................... G10L 15/183
2022/0244938 A1* 8/2022 Alamir ................... G06N 5/022
2022/0366147 A1* 11/2022 Ho .................... G06F 16/24522
2022/0374209 A1* 11/2022 Shek .......................... G06F 8/33
2022/0382524 A1* 12/2022 Ansari ...................... G06F 8/33
2022/0391181 A1* 12/2022 Bansal .................... G06F 40/20
2023/0107316 A1* 4/2023 Ripa ...................... G06V 30/10
700/29
2023/0125807 A1* 4/2023 Ripa ....................... G06F 9/451
715/771
2023/0339102 A1* 10/2023 Tapus .................. G06F 9/45558
2023/0393832 A1* 12/2023 Touati ..................... H04L 67/10
2024/0231766 A1* 7/2024 Ferreira .................... G06F 8/34
2024/0256784 A1* 8/2024 Harris ..................... H04L 51/02
2024/0370234 A1* 11/2024 Procopio ................... G06F 8/60
2024/0412157 A1* 12/2024 Manzano ............. G06Q 10/087

FOREIGN PATENT DOCUMENTS

WO WO-2017186469 A1 * 11/2017 ............. G10L 25/48
WO WO-2021182984 A1 * 9/2021 ........... G06N 3/0455

OTHER PUBLICATIONS

Keisala, Jukka. "Utilizing Large Language Models as No-code Interface in a Software Development Toolkit." (2023).*

Masili, Giorgia. "No-code development platforms: breaking the boundaries between IT and business experts." International Journal of Economic Behavior 13.1 (2023).*

Haile, Redeat Kassa. "Implementing a low-code AI-based chatbot on Azure combined with Boomi Integration." (2022).*

Ross, Steven I., et al. "The programmer's assistant: Conversational interaction with a large language model for software development." Proceedings of the 28th international conference on intelligent user interfaces. 2023.*

International Search Report and Written Opinion for PCT/IB2021/000388 dated Nov. 24, 2021, 13 pages.

First Examination Report issued for corresponding Indian Patent Application No. 202111025224 dated Apr. 21, 2026, 9 pages.

* cited by examiner 53
1
54
Processor
55
Memory
Display
56
Interface
57
49
NETWORK
51
59
58
50
54
Processor
55
Memory
Platform
52
61
54
Processor
60
55
Memory
Display
56
Interface
57

Oscar and Austin
About Us
Website
Call
Inquire
Contact
95

98
97
96
101
My Features
Design Customization
Here's a preview of your app
My Features
Enhance your app by adding/replacing the features you desire
About Us
100
99
Collapse view
Page Name
About Us
Content App Users
My Apps > Oscar and Austin > App Users
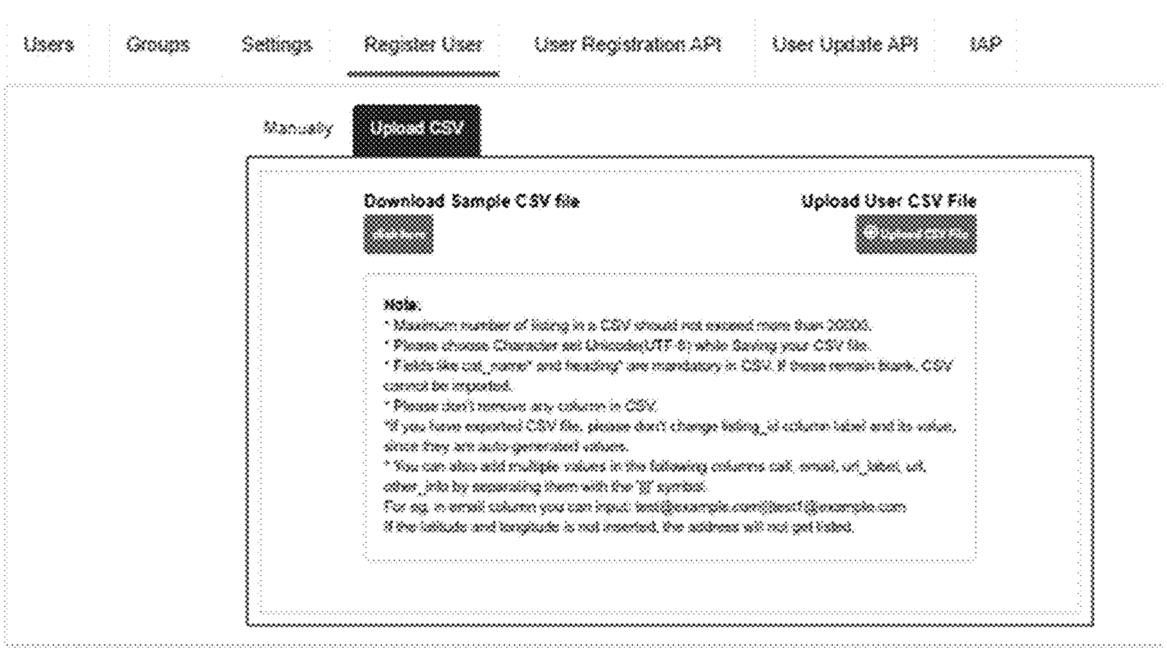
FIG. 10
App Marketing
My Apps > Oscar and Austin > App Marketing
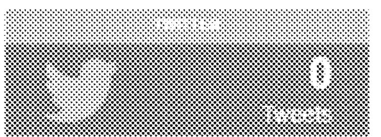
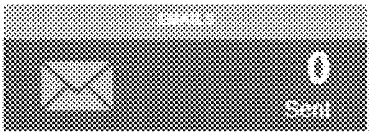
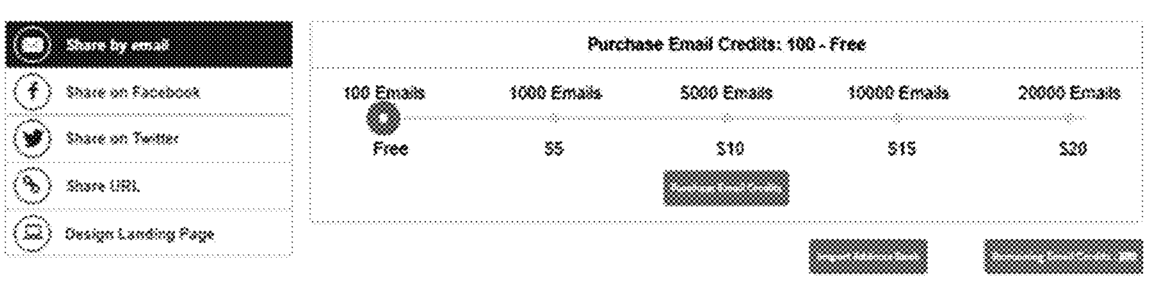
FIG. 11

API Response

| Codes | Description |
| --- | --- |
| 200 | Updated successfully |
| 201 | Updation failed |
| 400 | Bad Request |
| 500 | Internal Server Error |
| 2032 | API Key is required |
| 2034 | Email is required |
| 2038 | Invalid API Key |
| 2039 | Provide valid API Key |
| 2029 | Email already exists |
| 2040 | Phone already exists |
| 2041 | Email Invalid |

FIG. 12

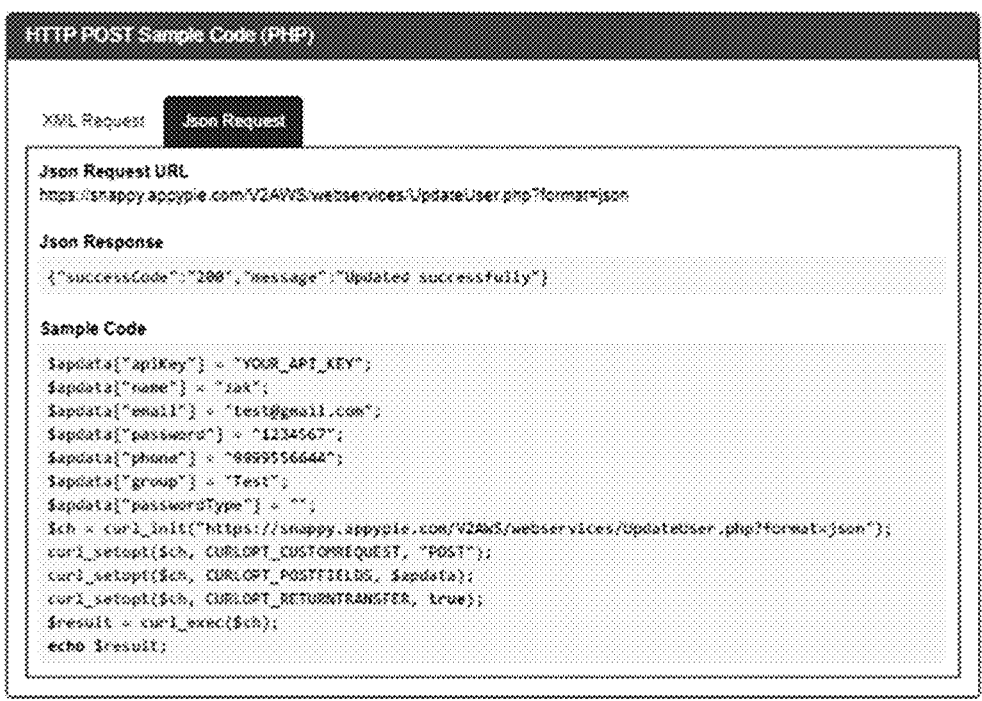

FIG. 13

HTTP POST Sample Code (PHP)

XML Request | Json Request

XML Request URL https://snappy.appypie.com/V2AWS/webservices/UpdateUser.php?format=xml

XML Response

```
<?xml version="1.0" encoding="UTF-8"?>
<response>
    <successcode>200</successcode>
    <message>Updated successfully</message>
</response>
```

Sample Code

```
$apdata["apiKey"] = "YOUR_API_KEY";
$apdata["name"] = "zak";
$apdata["email"] = "test@gmail.com";
$apdata["password"] = "1234567";
$apdata["phone"] = "9989556644";
$apdata["group"] = "Test";
$apdata["passwordType"] = "";
$ch = curl_init("https://snappy.appypie.com/V2AWS/webservices/UpdateUser.php?format=xml");
curl_setopt($ch, CURLOPT_CUSTOMREQUEST, "POST");
curl_setopt($ch, CURLOPT_POSTFIELDS, $apdata);
curl_setopt($ch, CURLOPT_RETURNTRANSFER, true);
$result = curl_exec($ch);
echo $result;
```

FIG. 14

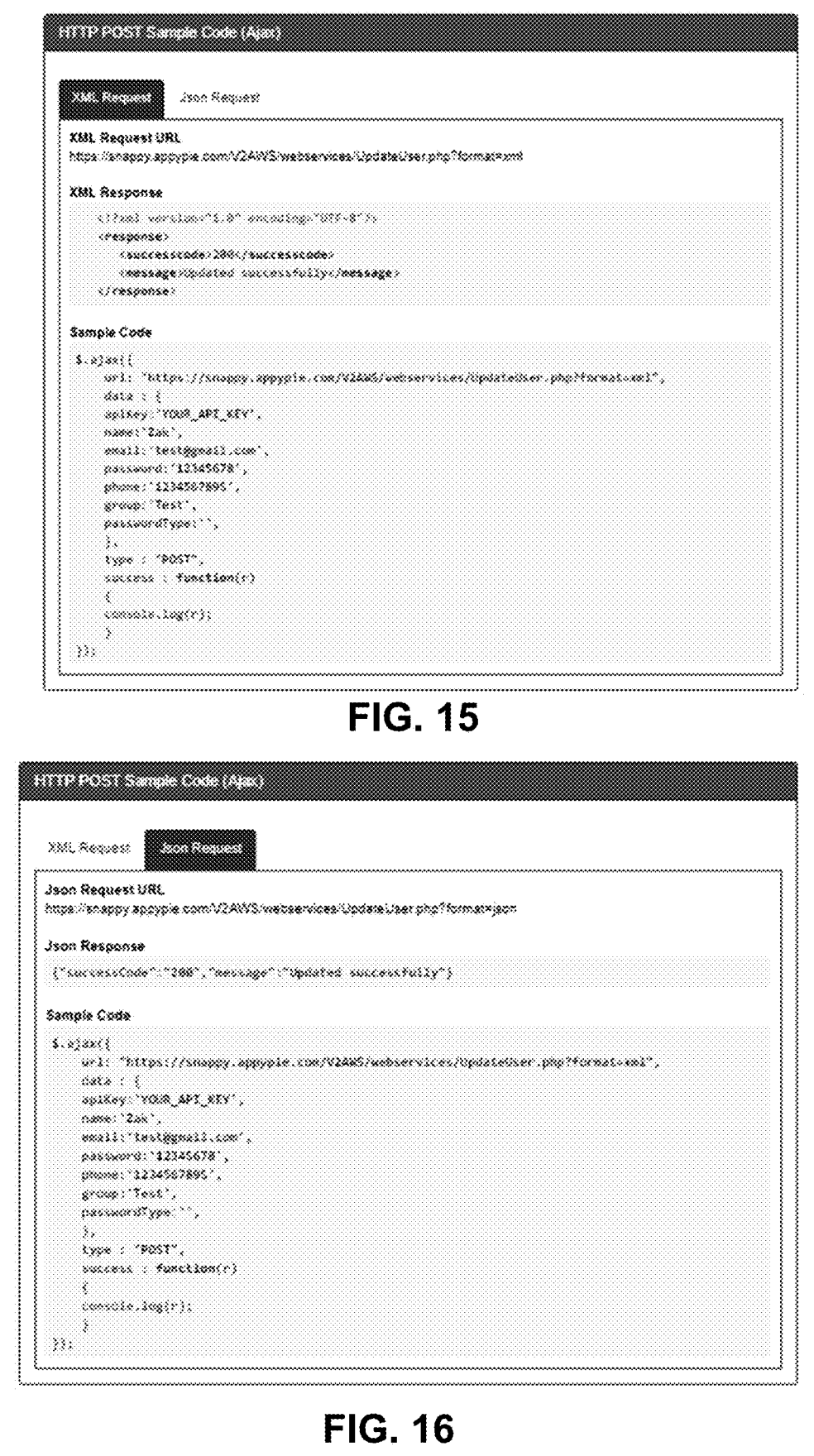

HTTP POST Sample Code (Ajax)

XML Request Json Request

XML Request URL https://snappy.appypie.com/V2AWS/webservices/UpdateUser.php?format=xml

XML Response

```
<?xml version="1.0" encoding="UTF-8"?>
<response>
   <successcode>200</successcode>
   <message>Updated successfully</message>
</response>
```

Sample Code

```
$.ajax({
    url: "https://snappy.appypie.com/V2AWS/webservices/UpdateUser.php?format=xml",
    data : {
    apikey:'YOUR_API_KEY',
    name:'Zak',
    email:'test@gmail.com',
    password:'12345678',
    phone:'1234567895',
    group:'Test',
    passwordType:'',
    },
    type : "POST",
    success : function(r)
    {
    console.log(r);
    }
});
```

FIG. 15

HTTP POST Sample Code (Ajax)

XML Request Json Request

Json Request URL https://snappy.appypie.com/V2AWS/webservices/UpdateUser.php?format=json

Json Response

```
{"successCode":"200","message":"Updated successfully"}
```

Sample Code

```
$.ajax({
    url: "https://snappy.appypie.com/V2AWS/webservices/UpdateUser.php?format=xml",
    data : {
    apiKey:'YOUR_API_KEY',
    name:'Zak',
    email:'test@gmail.com',
    password:'12345678',
    phone:'1234567895',
    group:'Test',
    passwordType:'',
    },
    type : "POST",
    success : function(r)
    {
    console.log(r);
    }
});
```

FIG. 16

101
Editing Tool
84
100
NLE Enabling Tool 105
102
203
Blind Mode
User Lexicography & Grammar Module
103
201
205
Voice-Enabled Mode
Solicitation Module
Database User Profile
104
Friend Mode
202
Simple Text to Aural Read Module
204
207
Voice Recognition & Breakdown Module
Storage Optimization Module
206
Repeat Confirmation System and Module

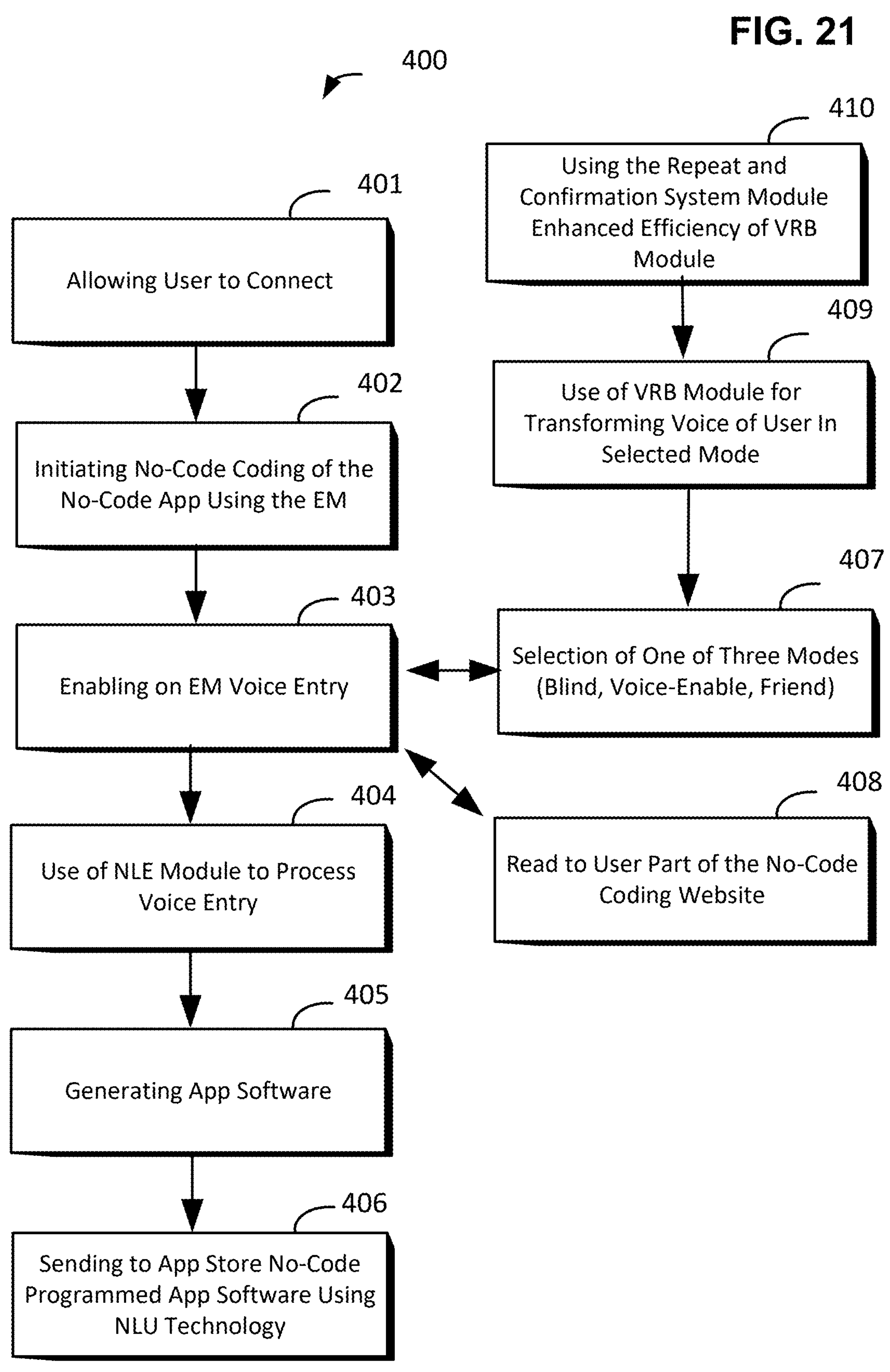
FIG. 21
400
410
Using the Repeat and Confirmation System Module Enhanced Efficiency of VRB Module
401
Allowing User to Connect
409
Use of VRB Module for Transforming Voice of User In Selected Mode
402
Initiating No-Code Coding of the No-Code App Using the EM
407
403
Enabling on EM Voice Entry
Selection of One of Three Modes (Blind, Voice-Enable, Friend)
404
408
Use of NLE Module to Process Voice Entry
Read to User Part of the No-Code Coding Website
405
Generating App Software
406
Sending to App Store No-Code Programmed App Software Using NLU Technology

AUTOMATED NO-CODE CODING OF APP-SOFTWARE USING A CONVERSATIONAL INTERFACE AND NATURAL LANGUAGE PROCESSING

This application is a National Stage Application, filed under 35 U.S.C. 371, of International Patent Application No. PCT/IB2021/000388, filed on Jun. 7, 2021, the entirety of which is incorporated herein by reference.

FIELD OF TECHNOLOGY

The present disclosure relates to a new and useful platform and system for the automated no-code coding of software Apps and other software using conversational interface based on Natural Language Understanding (NLU) or the associated National Language Processing (NLP) and method of operation and use thereof, more specifically a new platform and system either as a website or even as a stand-alone App-based software with a Natural Language Engine (NLE) for user entry to further power portions or the entire editing of no-code Apps using NLU/NLP and method of use thereof.

BACKGROUND

The history of software began about a century ago. Back around 1969, very early software helped the Apollo 11 crew land on the Moon. Code, a set of instructions much like have DNA, helped a machine offer functionality and operate the parts of a rover as many features remained mostly manual. Let us recall, early software programming relied on stacks of punched cards, each quickly fed into a reader to generate the "code" that could be executed by the computer in the memory of the device. Quickly, code programming evolved and layers upon layers of software was programmed and run to increase functionalities and create a software interface more user friendly.

Software, because of its complexity and the incapacity of any human to understand all of it, has historically been improved by layers where different layers, built on each other lead to function. The most notorious example is the 1985 release by Microsoft® of the Windows® built upon the Basic Input/Output System (BIOS). This new user-friendly layer of additional software had for main purpose the help users with a new "layer" of simplified interface to help start, manage, execute other software and run the computer.

The early punch cards, with simplified coding instructions were quickly replaced with a keyboard text-entry tool to create that helped create a file in which the code was as a text. At the stroke of a key, this code would be compiled by computers for execution. Code programming methods and the programming codes themselves were quickly enhanced with tools, HTML was created, C++ appeared each more intuitive for programmers.

Unlike what most people may think, improvements over the nature of user-software or interfaces thereof is not simple, obvious or even simple abstract ideas. Few changes slowly are implemented and are successful. The current invention relates to a latest new, non-obvious and not abstract tool to help users navigate into the world of software and create useful tools, more importantly, the current invention is a rare tool used to improve the programming of software in what is called a "no-code" mode of operation made to be "non-textual" with the help, at least in part, of automated natural language.

Let us remember, programming tools have been developed to help guide and simplify programming as software and software languages gained in complexity. Early software had maybe a hundred of "functions" (e.g. addition, subtraction, etc.) each empowered with a key programming string of character. Today, programming languages needed for the modern world and sophistication have hundreds if not thousands of functions resulting in tools to learn this language and master its programming/use to require the mastery of very thick guide books. Computer programming today is a very valuable skill and one that often blocks the development and release of new tools.

Some Abstract Notions

One of the key fundamental notions and associated tools to help automated and faster programming is the notion of "templates" which are designed with the notion that some things, some tasks, can be pre-prepared for some key uses and some users. Templating (e.g. the creation and use of templates) allows for the creation of stacks of solutions that only require entry of key pieces of information or commands considered "variable" to complete a function as a whole. Some known templating features, is one where a field of data is imported from databases or entered into a form-like interface. This is known as the use of variables in a fixed templated field.

One of the earliest and simplest tool relying on "template" technology is the letter/mailing templates in word processing. To understand how templating also helps functionally in real life, the frustration of field entry while renting a car can be helped by understanding that a "template" could be made for a tourist renting a car for a holiday and needs maximum insurance when compared to a second form for a business employee who is a frequent user and uses a corporate credit card. By simply using these templated forms, processes can be improved.

A second abstract notions known in software is the tool often used to help programmers with a single variable. This is done using a "library" called as such because of its structure. In certain cases, a variable is unknown by a user or a programmer and more importantly, this variable is called to evolve after a software is released. For example when a computer is released, printer technology will evolve after the computer is sold with new and better printers. To avoid having to update the software, the printer configuration is placed in a "library" of portions of code, each customized for a specific variable. By updating a library files with configurations of new printers, a software does not need to be updated.

A third tool often used to help programmers simplify code is the creation of modules/features that can be adapted to create a combined effect. Modulation of function is best understood in the filed of professional sports. While each sport is different, each has a phase of "game scoring" and a "play start" and "penalty action." Such features change for each sport but each game must rely on these notions to create play. Software can be partitioned with modules, each acting as a functional role to better understand how technology operates.

A fourth way to enhance software programming is the use of modulated and variable databases that can be cross-indexed easily to access and use any portion of the customizable information in it. For example, databases allows for programmers to quickly create simplified tools in software. One of the simplest database use is a simple list of countries and associated phone number codes. By using a database with such fields, a programmer simply calls a query for a user to "select a country" and the indexing simplifies the work. A programmer does not need to enter each country name and find codes and update of a country list is done by amending the database.

A fifth way to simplify programming is the use of structural logic features, that can be connected together (A, B, and C) where the relationship between A and B and A and C is defined in a diagram used to program the software. For example, if a user is asked a question and the answer is “YES” then element B is connected functionally to the user interface while if the answer is “NO” then element C can be connected in what often is described as a “drag and drop” process. Recently, an entire body of software logic was born out of such object coding where the vectorial relationship between fixed blocks is at the heart of the proper use.

The inventor’s work and invention, described below, relies upon new and novel tools designed to create enhanced software programming functionalities of such simplicity as to feel to a user like in fact there in fact no real coding involved. While such tools are described below, one of ordinary skill will understand such inventions are not “abstract” in that software, which has been around for nearly 100 years has never implemented these methods and processes as inventions which constitute “substantially more” than these core notions of simply improving how software can be programmed efficiently.

Also as way of background to the reader, certain key notions must now be explained to better understand the genius of the current new invention.

The Internet

In addition to ordinary stand-alone software, in an around 1996, what we know today generally as the “Internet” began to take form. As part of this online and digital structure being collectively built, millions of websites (content) began populating a digital network of servers connected via ground or wireless networks and electronic communications began to flow. Today, the internet as a whole is a powerful tool for electronic commerce, trade, advertising, and all other forms of communication too numerous to describe or explain. Around 2010, the Internet arrived on portable devices via integrated browsers. The Internet, generally said is in fact the first true decentralized used of software. A computer, given access to others can host one software for access remotely. Also, the software can operate in part in one computer, in parts in the other. Recently, notions of cloud storage and block chain ledger is premised on the notion that use of multiple computers can have additional benefits for a software as a whole operating over this web. While the term “internet” is used below, one of ordinary skill will understand the inventor does not limit himself to one specific type of network structure but in fact contemplates both the current networks available but also those to be created in the near future over new portable technologies.

The “old fashion” way to build a website was simply to write computer code using a coding tool and programming. Grew up as the clear favorite of the “world wide web” the Hypertext Markup Language (HTML). It is simple, mostly text, and using brackets and slashes can be used by non-experts. Websites are broken down in a plurality of text pages of coding each given the extension .html or .htm and stored a certain addresses (URL) on the web. Websites only require a main Uniform Resource Locator and built dynamically via links and submenus into subpages. Along with these text-based pages, content like image files, video files, and other links are also stored in a remove server. Over time, many users have become familiar with menu structures and indexing of single-purpose pages.

While the “internet” is now well understood generally thanks for decades of simplification of user interfaces, it’s inner workings have now migrated to a handful of specialists. A user’s work station is equipped with a “web browser” or a simple software capsule designed to upload the text-pages in HTML format, the associated content from a server and decipher the html code. The software is then located on a reader’s computer runs the instructions and upload and arranges as per the html code to display images, sounds, videos and dynamic links to recreate the pages on the web.

These browser’s primary function is simply to display and transform the html coding into content digestible by the user. Currently, the latest version of HTML is HTML 5.2 published as a W3C Recommendation on Dec. 14, 2017. HTML is very broad in that it today includes HTML4 variations like SGML-based or XML-based HTML (XHTML). What is undeniable is that the internet, as a whole, remains mostly visual. In addition to these “websites” a new generation of software was born to help service/adapt to portable devices.

The Mobile App (App)

The current invention, as described below requires Internet interface/programming but also App programming and use. A mobile application, also referred to as a mobile App or simply an “App,” is a computer program or software application designed to run on a mobile device such as a phone, tablet, watch or any other portable means of communication equipped with user interfaces that allows for the use of software applications. Often, the App is designed with a personalized single user (i.e. the cell phone user) connected via one of multiple modes of communication with a back-end server where the App’s core application is run by the party producing the App. Some Apps can be stand-alone and operate without a back-end like, for example, games.

In 2009, opened App-stores online such as the App Store (iOS), the Apple® App Store or Google Play Store® that was designed as a online source for these Apps. Programmers place on these stores Apps of many types for upload (free or for payment). Apps are routinely updated, are subject to unique requirements and serve unique purposes. For example, Apps often installed on cell phones can have access to GPS information, biometric information of the user, camera access, etc. Apps often will be associated to a single user in concept while they can be set up for many users. App stores also coordinate with operating systems in the phone to help routinely and periodically update the software version. Currently, App Stores have millions of Apps stored for use.

At the moment, like all software, Apps must be “coded” which means a user, often using a typed interface enters key commands and code linked with one of numerous languages of programming (e.g. Objective-C which is one of many C variants, Swift, HTML5, C#, C++, Java, Python, Kotlin, Lua, etc.). For example, coding Apps for iOS operating system, aka Apple® products for use on the iPhone® or iPad® uses what is called building modules, libraries, and back-end task like storing data. Similarity Android® Apps are similar in many ways and often are just coded using different tools or programming languages.

Some of the leading tools for helping App programming include Appmakr®, AppyPie®, Imagex®, Intellij®, Flutter®, or Xamarin®. Other terms of art in the field of programming is User Interface (UI) coding or User Experience (UX) design. In most instances, App designs include a Soft Design (SD) followed by creating and coding a prototype, followed by a Hard Design (HD) before the build of the App. Finally, a user test is conducted before publishing and marketing.

One of the key issue and problem with programming an App is the need to hire, retain and engage expert programmers or service providers who must learn about a business, understand the business need and create the App over a long period of time. In the world of Apps and their applications on the market, the need for new Apps is often very quick. A new generation of phone is released each year with new features that can be leveraged by new Apps to help give users optimal management of the technology. A "race to the market" often makes the first App programmer to arrive on the App Store® with a needed new use to be the one who corners the market. Part of the problem is to update the existing App or create and program a new one, requires time and effort. As part of this specification, the above is what is described as "code platforms" or "coded" Apps.

Voice Enable Devices

In tandem with the development of the 'internet,' simpler and more intuitive interfaces are being developed to help users of technology better manage these normal common use products and systems. For example, refrigerators or even cars, once simple mechanical devices operating directly from a power outlet or an engine, local sensors now are coupled with onboard technology of many types to give users enhanced features. As these products appear on the 'internet of things' they must be upgraded with multiple processors, wireless links, and user interfaces like keyboards, screens/displays, and electronic touch screens to help users get additional functions.

But as one can easily understand, even the simplest of physical interface requires learning of the interface and also knowledge on how to operate. For example blind people, children or the elderly may wrestle with even the most simple of interface. This is made even more problematic as every piece of equipment is now being equipped with these additional functionalities and digital interfaces. In a kitchen, a person must learn one interface to prepare coffee, another interface to manage the refrigerator, and one last interface for order milk. One solution has been to use integrated systems, like single-hub systems that manage multiple pieces of equipment but programming such systems initially results in only creating an additional layer and compounding the problem. Also, another solution is to use remote cell phone interfaces (e.g. Apps) to help manage these different components. Once again, this solution suffers from the same problems as those trying to be resolved as they only increase the burden on individuals and offer mostly visual information.

Voice-User Interfaces (VUI)

VUI's generally makes it possible to have spoken audible human interaction with a computer. Using speech recognition to understand spoken words, then translated into spoken commands, speech (audio) can be transformed into audio files (e.g. .wav files) or text to generate a response from a system. Most VUI include a two way communication that include (a) a microphone for input of the information to the computer, and (b) a speakers able to transform electrical impulses into audible sound back to a user.

As part of phases (a) or (b) the communication can also be one-way audio and one way visual, for example when a person speaks to a cell phone and the system responds by performing functions in the software and displaying information. Another known VUI having a single (a) aural and (b) non-aural is the television remote control system where a user speaks into the remote and the system returns the proper information. Generally speaking, the interface is better designed as a two way audio (i.e. speaking to the device and having the device respond using a voice).

Recently VUI have been added to automobiles, home automation systems, computer operating systems, home appliances, or even television remote controls. Some aural systems (like a car emergency system) is a direct line of communication between two humans. Other systems are designed with automated voice segments to mimic human voice for menu interaction. For example, when customer service is called for credit card problems, a user on the phone will navigate an aural interface until finally it reaches a human.

Some new VUI systems also use stronger voice recognition systems that include software designed to adapt to single users as they use the system frequently, systems to understand dialectal influences or accents from foreigners. These systems also have algorithms to filter the voice and sound heard to help people talk in noisy environments. Most computer systems (Windows Vista®, Windows 7®, Mac OS X®) come with some versions of VUI. Mobile devices also come with VUI of some type as part of the Android® operating system. Over time, these system are improving in efficiency.

Natural-Language Understanding (NLU)

Champollion, the famous translator of Egyptian Hieroglyphs was once asked how reliable was his translation. Explaining the difficulty of understanding speech, he said: "When a daughter writes to her parents a letter, these are the people who know each other the best. The daughter can write as carefully as she can, you can bet the mother reading the letter will show it to her husband and ask 'What do you think she meant here?" Human communication, in any form is greatly imprecise, complex and subject to much interpretation. Human language and mode of communication is often called "Natural-language" when compared with other forms of communication.

Humans speak and think in a very unique way based on social interaction. Humans communicate with intent, adapt what they say based on the environmental factors such as hesitation, emotional response, timing. Humans are able to distinguish accents, reconstruct in their minds partial information in a call which has words missing. Humans understand irony, sarcasm, humor. The human brain is a powerful tool that is designed to help a person navigate intelligently the world around them. For example, if a human is in a bakery and a baker shows up, the human brain will have quickly memorized how the social interaction occurred with the previous customer. A person will subconsciously know that there will be a need to define boxing of products, money transactions, and description of what is needed.

Computers are much simpler. Those who desire to interface with a human in a way different than through a simple text-interface must be designed to understand "humans" in a more efficient way. Most natural-language-undemanding computer systems share some common components. They include (a) a lexicon of the language, (b) a parser, and (c) grammar rules to break sentences into an internal representation. The creation of rich lexicon with a suitable ontology required significant effort, for example the Worldnet® lexicon required many years to develop. Computers also need to understand rules of semantics to guide comprehension. Semantic parsers convert natural-language texts into formal meaning representations. Often, computers will need to transform a derived meaning into a set of assertions in predicate logic using logical deduction to arrive at conclusions.

For example, a software offers a 20% coupon in exchange for the email of a user. In terms of computer language, a first page will ask if a coupon is desired and if an email is given, it must be compared with a database of know users to know if the coupon can be issued. In the case of natural-language-understanding, a user could want to program these functions and would say "Can we offer a coupon?" First, the computer must understand the request is rhetorical and is in fact "We need to offer a coupon." The computer must then be able to read these words irrespective of the voice, the accent and the speed of speech.

In early natural-language systems, to be able to understand a person, a series of set texts were asked to be read out loud in order for the system to lean and calculate the user's own syntax and accent. This required time and effort and created systems only able to adapt to a single user. What is needed is a system, process, method of use that is able to leverage natural-language systems to help further enhance programming facilities of software.

Natural-Language Processing (NLP)

Natural-language processing (NLP) is a branch of artificial intelligence that deals with the interaction between computers and humans using 'natural' human language. The objective of NLP is to read, decipher, understand and make sense of human languages in a manner that is valuable for computers. This subfield of linguistics, computer science, and artificial intelligence is concerned with the interactions between computers and human language, in particular how to program computers to process any analyze large amounts of natural language data. In the field of espionage, systems must be able to quickly listen to millions of communications, often spoken purposefully to be misunderstood and devise the intent and translate it to computer-readable media.

In the 2020s, representation learning and deep neural network-style machine learning methods became widespread in NLP due in part to a flurry of results showing that such techniques can achieve state-of-the-art results in many natural language tasks. One method of NLP is the statistical method born in the mid 1990's. Multiple types of algorithms include decision trees, hidden Markov models, and real-valued weighted values. At the heart of these systems is the notion that certain things, words, can be found over and over. By placing rules of construction (e.g. a verb is before a noun) the system can help quickly find the meaning of terms. Currently, the most recent NLP techniques are based on artificial neural networks.

Machine learning recently has focused word embedding to capture semantic properties of words. Neural Machine Translation (NMT) emphasizes the fact that deep learning-based approaches to machine translation directly learn sequence-to-sequence transformations. Common NLP tasks include Optical character recognition (OCR) to transform image into text, speech recognition to create better written text from speech, speech segmentation to better cut words from each other, text-to-speech is a tool for the visually impaired. Tokenization is word segmentation to help create better text. Lemmatization is the art of removing inflectional endings. Morphological segmentation creates morphemes and words from phrases. Tagging of speech allows for the creation of verb, adjective, etc.

The above should suffice to explain how any technology, which operates and improves the way software, software programming, the internet, Apps is improved used artificial intelligence is nothing short of complex and not abstract. What is needed is a way to enhance the process of programming of software including Apps in a better, faster, cheaper way.

SUMMARY

The present disclosure relates to a new and useful platform and system for the automated no-code coding of software Apps and other software using conversational interface based on Natural Language Understanding (NLU) or the associated National Language Processing (NLP) and method of operation and use thereof, more specifically a new platform and system either as a website or even as a stand-alone App-based software with a Natural Language Engine (NLE) for user entry to further power portions or the entire editing of no-code Apps using NLU/NLP and method of use thereof.

DRAWINGS

The drawings described herein are for illustrative purposes only of selected embodiments and not all possible implementations, and are not intended to limit the scope of the present disclosure.

FIG. 1 is an image from the prior art, namely FIG. 1 of U.S. Pat. No. 7,702,508 titled U.S. Pat. No. 9,318,108 titled System and Method for Natural Language Processing of Query Answers illustrating the use of a Natural Language Engine needed for the technology shown.

FIG. 2 is an image from the prior art, namely FIG. 1 of U.S. Ser. No. 14/858,841 titled Natural Language Interface to Databases.

FIG. 9 is a view of the edit module of the different Apps according to an embodiment of the present disclosure.

FIG. 10 is a view of the management of App Users associated with the App produced with no-code NLU using this invention according to an embodiment of the present disclosure.

FIG. 11 is a view of a App Marketing tool to help manage different marketing issues according to an embodiment of the present disclosure.

FIGS. 12-16 illustrate different sample codes linked with XML and Json requests of an API feature and associated codes in association with one embodiment of the present disclosure.

FIG. 21 is a figure illustrating the method steps of the method linked with a no-code NLU-based Engine for the platform and system for the automated no-code coding of App-software using conversational interface based on natural language understanding/processing and method of use thereof.

Figure 1:
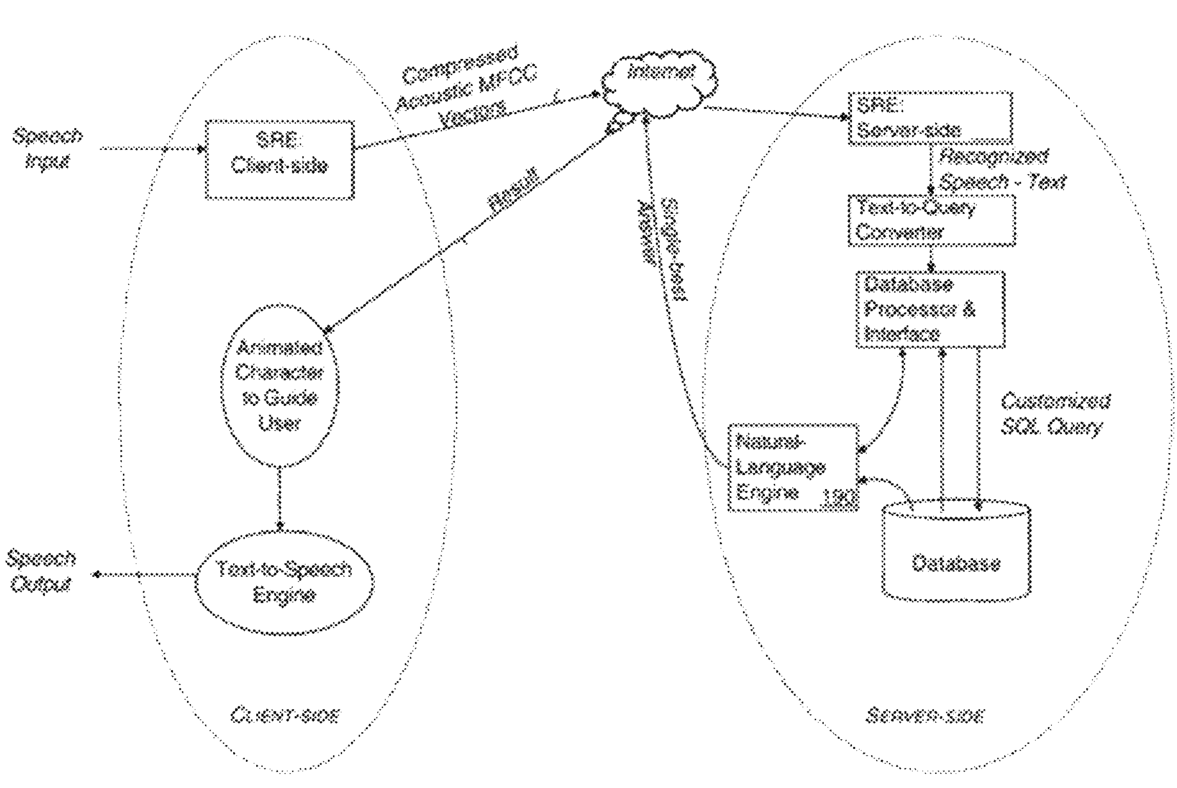

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Natural Language Technology

The inventor has described herein and invented new Natural Language (NL) technology and tools designed to served as a Natural Language Engine (NLE), a Natural Language Process (NLP), or a core for Natural Language Understanding (NLU) is the unique new App-technology world and linked with the unique no-coding system and method of use described below. Such results in new features and functions which are substantial improvements over the existing art. One designed to process a very unique set of information designed not only to recognize speech and words, but instead understanding it lexically.

U.S. Pat. No. 7,702,508, granted to Ian M. Bennett directed to a new system and method for natural language processing of query answers. As shown at FIG. 1, at the left of the diagram, a person speaks into a client side into a device. The voice is then sent to the internet shown in the middle and then this is received on the server side on the right of FIG. 1. A first tool (a) recognizes the spoken words and translates it to text. This text is then, in a second module converted to a query or a demand. The query is then sent to a processor/interface for then indexing the database where SQL Queries are exchanged. Finally, on the server side is a Natural Language Engine (NLE) located between the database and processor interface and the database.

Mr. Bennett describes the NLE explains that tools allow to make the speech recognition process more reliable, context specific grammars and dictionaries are used, as well as ordinary natural language processing routines designed to analyze the user questions lexically. This includes context-specific processing of speech data. This allows to run routines to result in fast and accurate matches to secure a unique and responsive answer. This process allows for the linguistic morphological analysis of the user's query and the result from the database query. Also as part of the analysis, parameters are extracted and sent to the database process. Statistics are also stored in an array for the 2nd step of processing. This creates a better Speech Recognition (SR) to Natural Language Processing (NLP) match. The system then uses a large linguistic unit, then charged with the parsing, understanding and indexing of the large linguistic unique or set of transcribed utterances. This allows using NLP to understand lexically or morphologically the entire unit or set.

This previous technology describes very generally how this NLE works and does not offer any guidance as to how such techniques can be applied and optimized when linked with no-code coding.

Figure 2:
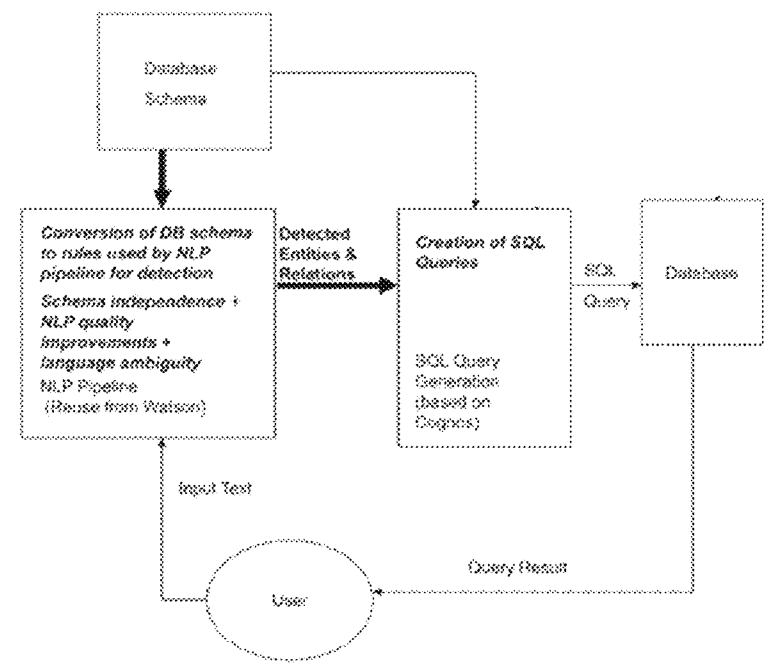

FIG. 2 shows at FIG. 1 for example an IBM® application relating to Natural Language Interfaces to Databases filed as U.S. Publication No. 2017/0083569. This method is directed only to questions (queries) that are verbalized. Concepts are given names, properties and an ontological representation of this data located in a database is generated. Using rules for a set of templates connected to an input port, these templates are given rules that are not language dependent to allow, for example to disassociate the database from the language of the user. A rule generation engine with ontological representation of the data and the database are then template to identify entities and relations to the natural language query.

The inventor has created a NLE module built around a trigger/action model of semantic parsing. From a piece of user speech (usually a few words) the system is then triggered into action after the text is (a) parsed, (b) modulated for voice recognition, (c) reviewed and compared with a database for interpretation of terms. Once a trigger is determined in a first step, an action is then determined the composition/set of instruction to the built/edit module can be initiated. For example, a slack action can be created. As explained, a library of NLE features, each with a intent name is then determined.

Low Code Platforms—Low Code App Coding

In contrast to the above fully coded Apps, a programmer using a programming code will be forced to type/structure every portion of the software to be created. This will be costly and time consuming. For example, if a user navigates between hundreds of pages in a network or three-like structure, the programmer will have to add navigation buttons and features, add graphics to be uploaded and displayed and program where information will be entered and what format will be selected. But one of ordinary skill in the art will understand that most of the software sold or distributed have similar functions, similar navigation requirements and such other commonalities. Half way between the full code (aka code) and the no-code solutions resides a low-code zone where partial automation is provided as part of the coding process. The technology described below for NLU for no-code platform, where applicable can also be added to low-code systems.

Low-code platforms can be used by non-programmers or non-technical employees but at some point, the work product will be given to a developer to transform the basic information to a finished product. Low code platforms or rapid application tools like Codebots® for example have pre-built functionalities that enable users to build their application to a certain point. Once that is done, a developer/coder will take the work and complete the effort.

Low-code platforms rely often on automation tools that result in rapid application tools. Low-code platforms primarily target developers, enabling them to rapidly build working front-end prototypes in a matter of days, or even hours. This allows them to get to the most interesting part of software development, customization. Low-code platforms in contrast with no-code often will be able to give more processes and database accesses that would be difficult to generate in no-code systems. For example, if a person needs a new dating App, this tool will have to be able to do new features and functions over simply connecting users, storing data profiles on users and displaying a better interface. Such a dating App might, for example, connect with a dating group's own website and database and customize yearly payments, memberships and more importantly the transfer of data for secondary work.

No-Code Development Platforms (NCDPs)

The inventor is an expert at no-code development platforms (NCDPs). No-code platforms for the moment target the smaller businesses, those with limited needs or limited tools for use. A no-code development platform is a software interface aka a tool for building software applications without actual coding by the user. This is a popular alternative to traditional code development. What is called "citizen developers" can be anyone who is able to use a computer interface. No-code systems, a bit like the Spotify® automated process of creating websites can rely on multiple drop and drag features, templates to guide the user, etc. One of the key problem with low-code and no-code tools is the lack of flexibility. A coder is only constrained by the person's capacity to bend the code to his/her needs. In contrast, in low-code or no-code systems, the sophistication of the pre-built tools offered to the user will determine which feature or function can be used to create and App.

For example, if a new generation phone is created that now includes a sensor able to measure blood features by placing a finger over the sensor, a coder who is given the specifics of what data is generated by the sensor will be able to quickly create code which processes the data and offers to the App tools to use the sensor. In contrast, in low-code or no-code systems, the automated processes must be set up to offer the sensor data processing. The low-code or no-code platforms will have to run to the market with a new version giving this additional functionality. By far the most useful feature of low-code or no-code platforms is the efficiency and reliability of the systems. While some programmers may be gifted, employers or App clients should not have to rediscover the "wheel" each time they need to update technology. In low-code or no-code solutions, the heavy lifting is done by a service provider in charge of the automated tool box offered and once the solution is available, it is much more likely to be functional and not result in multiple mistakes and problems once the software is released.

To illustrate advantages of no-code platforms, the City of New York recently built and launched a Covid-19 crisis management platform in less than 72 hours. This solution included a mapped virus hot sports, connecting residents to critical services and other similar features. As the power of no-code systems improves, the diversity of the solutions that can quickly be produced increases. As one can imagine, in the above example, coding efforts would have taken much more time but would have allowed other features not possible.

Often, the no-code coding systems must rely on heavily automated editing tools which are user friendly and allows for the user, who is no programming expert to avoid the programming logic.

Hardware

Since 2010, the Patent Office has placed obligations on patent applications to include, as part of this specification a description of at least one method, known, how the software technology described logically and diagrammatically into a real-life embodiment and function.

As described below, the current system and platform, while mostly software reside on hardware in one of multiple pieces of a system. Since some materiality must be shown in association with the new system, a handful of elements are shown. The computer/software layer must be secure, reliable, and easy to maintain. Shown at FIG. 3 is one of numerous potential hardware configurations capable of hosting and executing the platform and system and for executing method of use linked thereto as described herein.

Figure 3:
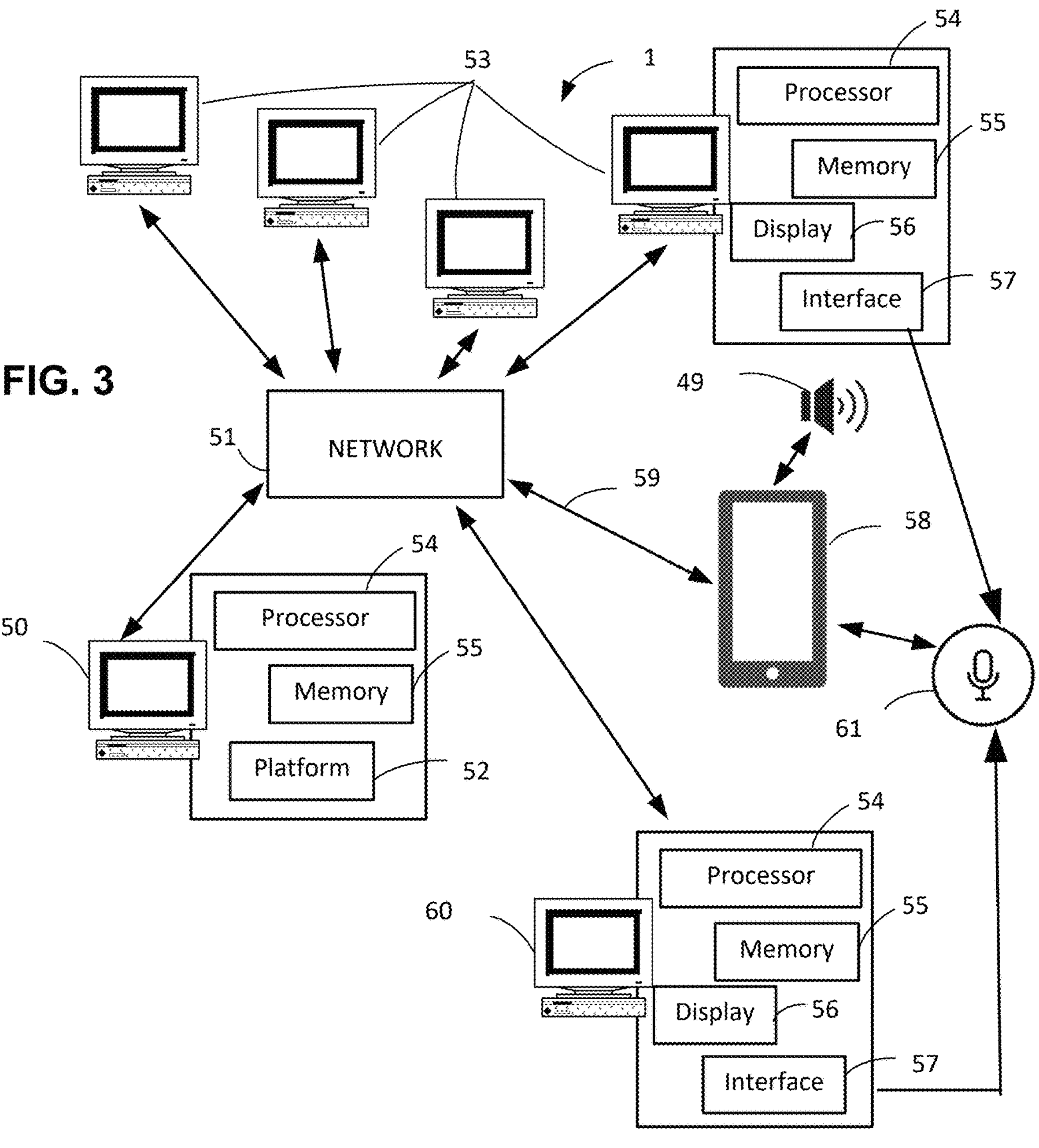
FIG. 3 is an illustration of the hardware structure that may be used to embody the invention according to an embodiment of the present disclosure.

In its simplest configuration, FIG. 3 shows a system 1 with remote server 50 or any other type of computing device connected either wirelessly, via landlines, or in any way to a network 51, such as, for example the internet and/or a wireless cell phone system with or without data. As shown today, a plurality of personal computers 53 such as Personal Computers (PC's), laptops, hand held devices like a tablet, a web-enabled phone, or any other web-enabled device each generally are built with a computer processor 54 are in turn connected to the network 51. As shown at 49 is a speaker for playing .wav files which most computers are equipped. Such speakers, for example on cell phones or portable watches use speakers located via Bluetooth on ear pieces.

Figure 4:
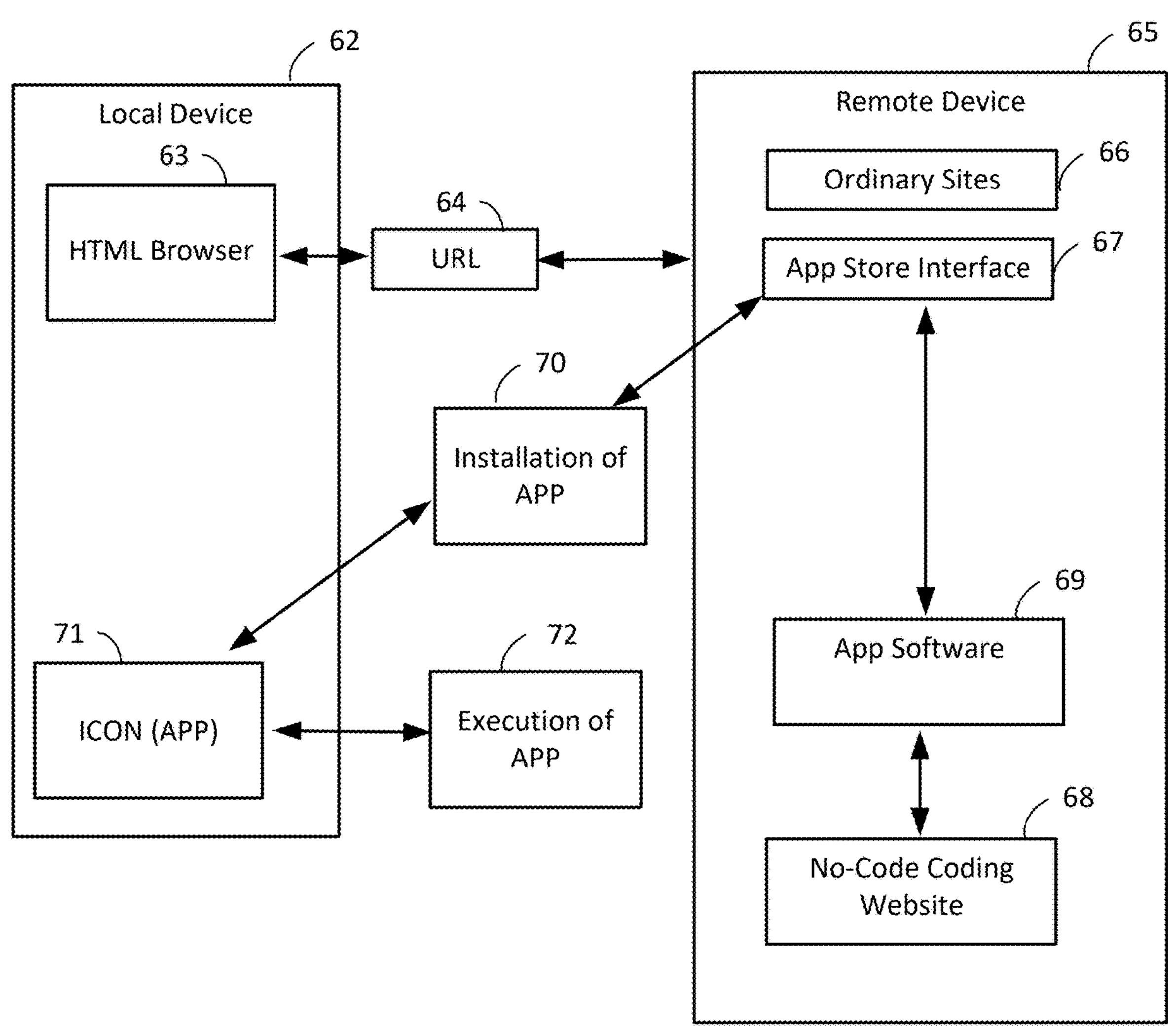
FIG. 4 is an illustration of the general software layer used by the hardware of FIG. 3 to generally process the invention according to an embodiment of the present disclosure.

The server 50 or the personal computers 53 can broadly be described as having a processor 54 each connected to a computer memory 55 designed to operate in tandem with the processor 54 to execute several layers of software needed for operation (e.g. operating system, bios, internet, etc.). In addition, most devices 50, 53, or 58 have a display 56 for use. Such display 56 is generally found on the server 50 but is not absolutely needed. The personal computers 53 do in fact require some type of computer display 56 connected to the computer processor 54 for interaction with potential users using the platform 1 hosted in the hardware shown at FIG. 3. The display 56 helps the user navigate over a software interface 57 as shown at FIG. 4 to display different information in the computer memory 55 by the computer processor 54 over the interface 57.

Also as shown, is for example a cell phone 58 which is also connected 59 to the network 51 either via Wi-Fi or cell-phone means or any other means. One of ordinary skill in the art will understand how cell-phones, now fully autonomous machines (e.g. 50 or 53) also includes the features of a full computer. In the above, what is also shown is a remote third party server 60 also equipped with similar features of a processor 54, a memory 55, a display 56, and an interface 57 which for example serves as the depository of the App (aka the App Store) where hundreds of thousands of Apps are located in the memory 55 and can be accessed via an interface. One of ordinary skill will understand that such structures are subject to change with technology like cloud storage, remote storage, blockchain ledgers, etc.

Within the scope of this disclosure, the term computer display 56 includes more than a screen or other visual interface, the term display is designed to include any interface capable of interacting with a person, whether visual, oral, touch, or any other interface. A personal computer 53 also includes running as part of the memory 55 and displayed on the computer display 56 an interface 57 and is connected to the computer processor 54. Also as shown, this interface may include a microphone 61 connected to the devices 53, 58, and 60 which allows for recording of sound and words for use by a system which is designed to process human voice.

Some User Software Interface

In one embodiment, the processor 54 executes an operating system (not shown) and an associated HTML web-enabled browser capable of displaying to a user using the platform 1 connected to a network 51 like the World Wide Web also called commonly 'the Internet.' The term network is used as part of this disclosure and encompasses broadly any type of computer network, over hardware, software, or wireless such as for example a Local Area Network (LAN), or any other network where the platform can be found.

Figure 22:
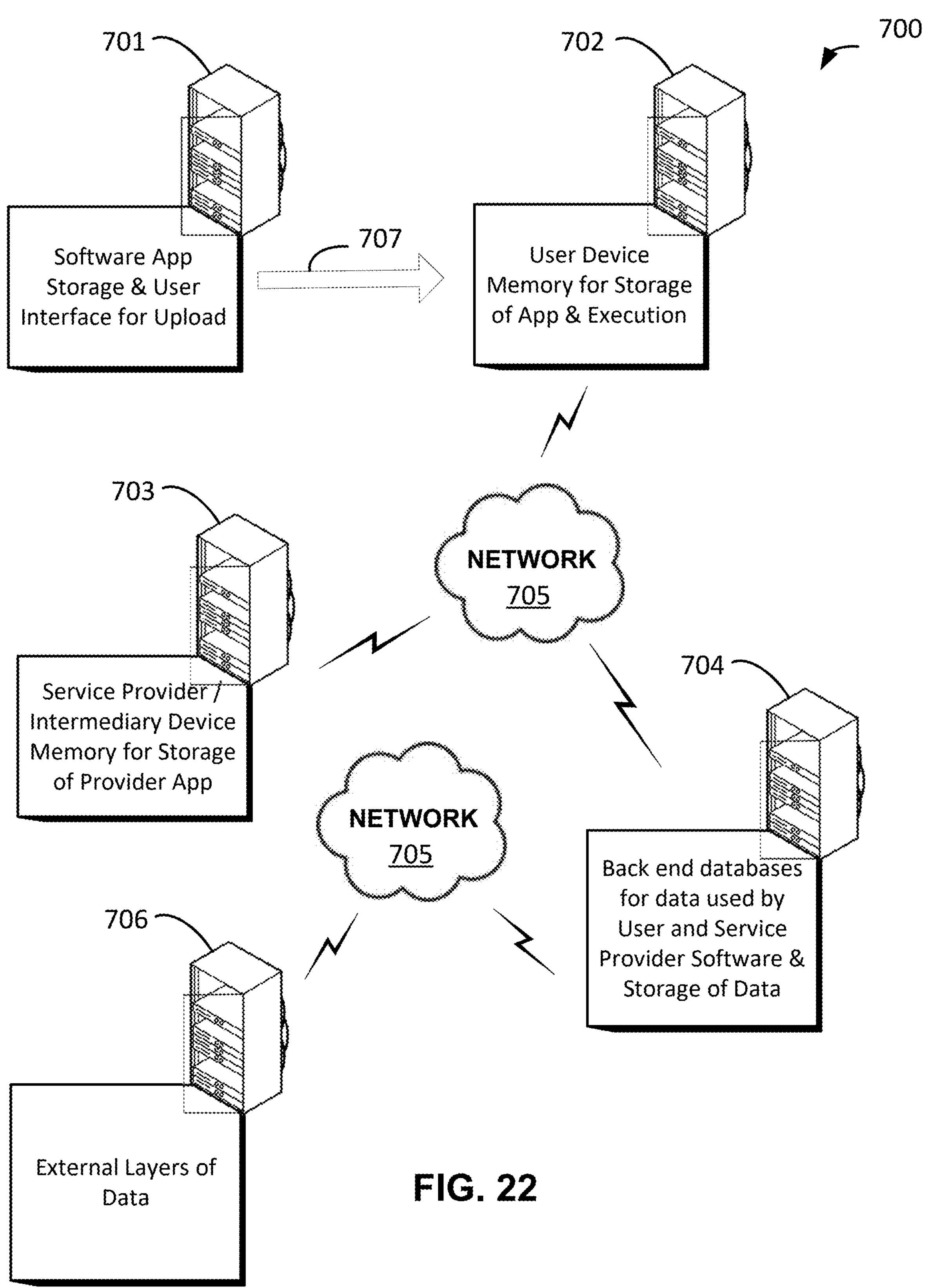
FIG. 22 is an illustration of a network of network connected servers for empowering the technology of this invention according to an embodiment of the present disclosure.

At FIG. 22, what is shown is a network of back-end servers 700 to replace the third party server 60 as shown at FIG. 3. Many understand today with cloud-computing and App-database service that while one server 60 is shown at FIG. 3 for simplicity purpose, in fact network includes a first server 701 where Software Apps are stored & User interfaces are also located for upload. A service provider 703 may have intermediary devices and memory for storage and to provide software like Apps connected to a network 705 to help manage the situation and speed processes up. On a user device 702 as shown at FIG. 3 as 50 for example, the memory and storage locally can store the App and execute the software. Remotely, multiple back end databases 704 can be used also connected to a network 705 to help manage multiple layers of external data.

FIG. 4 shows how the HTLM Browser 63, located installed and located (upload and executing) on any of the devices 50, 53, 58, and 60 shown at FIG. 3 all include sufficient low-level software layers which allows for the execution of operating systems able to run one of numerous internet browser such as Mozilla® or Explorer® that each can be installed locally and run inside the memory via the processor can be used to connect via a Uniform Resource Locator (URL) 64 to one of any websites 66, 67, or 68 at one of numerous remote devices 65.

Illustrated on the remote device 65 includes ordinary sites 66, an App Store Interface 67, and a No-Code Coding Website 68 which empowers the technology described herein to generate an App using no-code and Natural Language Understanding (NLU) as described below. This website 68 when used by the Local Device 62 having a microphone 61 at FIG. 3 to use via the HTML Browser 63 and the URL 64 to connect to the No-Code Coding Website 68 located on the remote device 65 for the generation of an App Software 69 to be placed upon the App Store Interface 67 for installation 70 back to the Local Device 62. This App installed 70 then appears as an icon 71 on the local device 62 which if clicked will launch the App 72 that has been generated 69 by the website 68 and sent for upload in the App Store 67 for installation 70.

Figure 23:
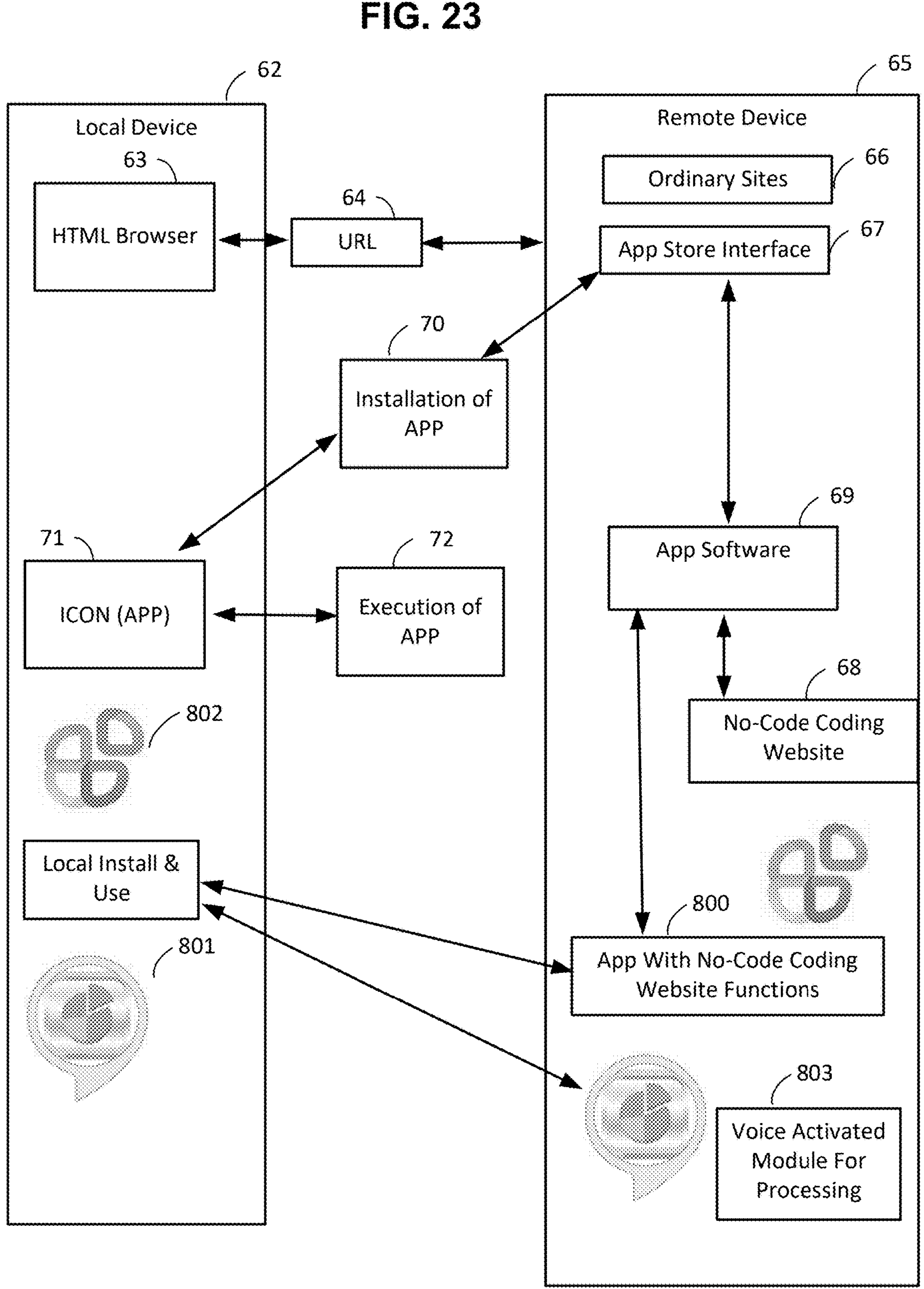
FIG. 23 is an illustration of the general software layer used by the hardware of FIG. 3 with additional no-code coding App to generally process the invention according to an embodiment of the present disclosure.

As shown at FIG. 23, in addition to a "no-code coding website" as described generally above and below with great specificity and shown at FIG. 4, the Inventor also has created a stand-alone App 800 instead of a website which serves the same purpose but has to be pre-installed on a person's device 62 as shown, an App 800 is created instead of the website 68 which offers similar features. The App 800 can be located on the App store 69 for upload via the App Store Interface 676 and installation 70 locally as shown at 802. In addition, for example, a version that includes a voice activated module for processing 803 can also be offered as a stand-alone version also for installation 801 on a user's phone and device 62 as shown at FIG. 23. Offering a different choice (i.e. an App instead of a website) is only illustrative of how this technology can be offered in one of multiple ways on different tablet, a voice-enabled watch, etc.

No-Code Coding Website

Figure 5:
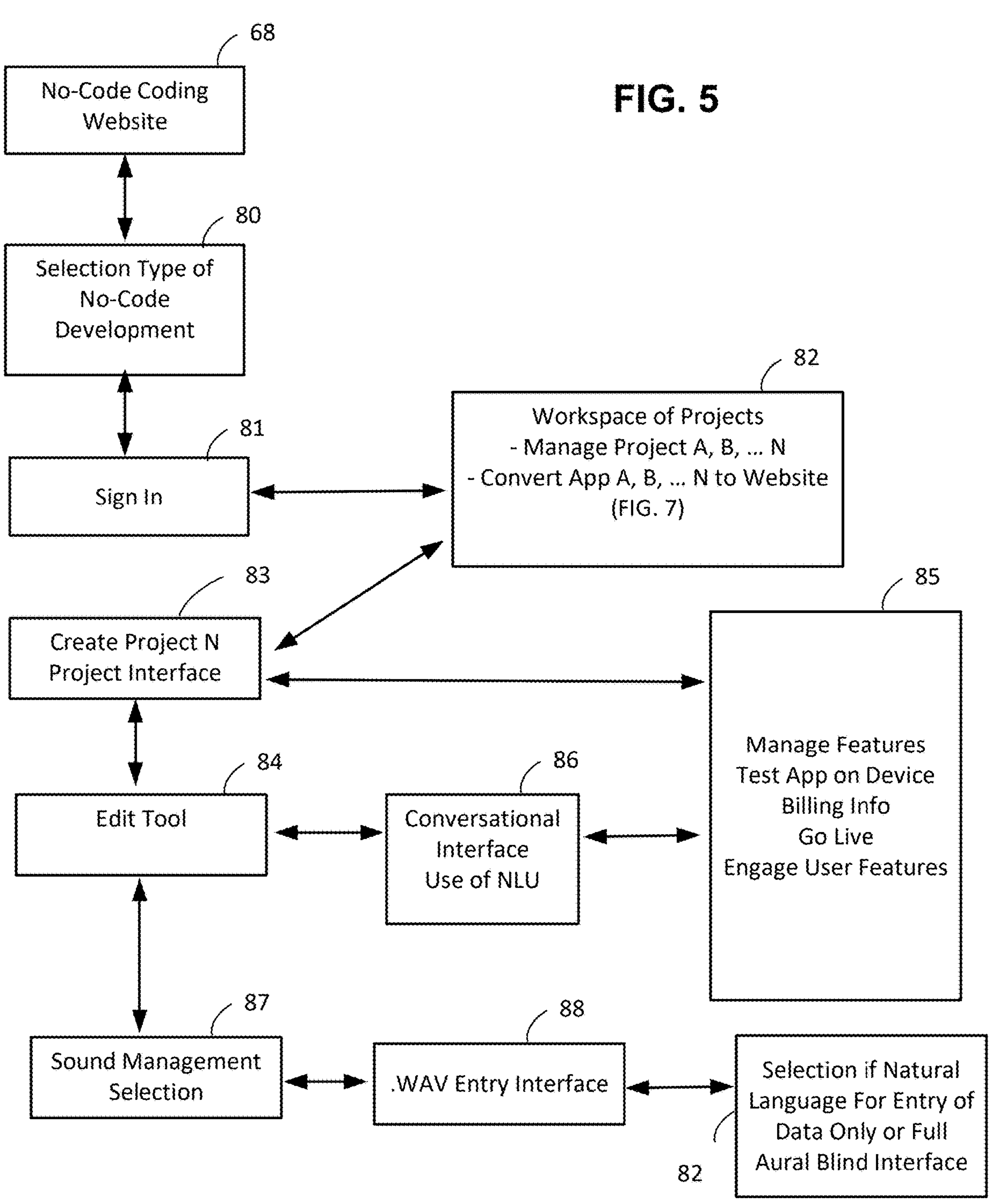
FIG. 5 is an illustration of the no-code interface offered by the inventor according to an embodiment of the present disclosure including the conversional interface based on Natural Language Understanding.

FIG. 5 illustrates some of the key functional pieces of this programmed HTML interface. Generally speaking, after the website is entered 68 as described at FIG. 4, it then offers an HTML interface which first asks a no-code programmer to select 80, for example a website, a Task Automation, a Chatbot, Graphics, Livchat, or a an App. While the technology described below relates and describes mostly new technology and NLU in relationship with a Mobile Application aka an App, one of ordinary skill in the art will understand how the technology can be implemented in such other applications.

A simple sign-in is generated and used during one of multiple ways to connect the user with the website (e.g. Google®, Facebook®, Password/Username). Once signed in, in a very friendly interface, using tiles, each project is illustrated and each is given one of two options 82 between managing/editing the project no-code software or to convert the App already created to a fully animated website in HTML 82. The conversion to a fully animated website is done by using a module which takes the content of the App editing tool and transforms it into a network and directory of HTML format webpages.

Now initially creating or selecting one project N at 83 a person is offered a page with an edit tool 84 and other project management tools 85. The Edit tool 84 is described in greater details below and the other features include (a) the management of feature-based programming, (b) testing the App on a device, (c) Billing related information, (d) Go Live features and a series of (e) engage of user. As the Conversational Interface is then enhanced to include NLU 86 and is added to the edit tool 84 as shown at FIG. 5.

The user, as part of the edit tool (or other up the stream processes) is then given the interface 86 which appears as part of a selective choice 87. The user is then allowed to use a sound (aka .wav) interface by entry of voice 88. The inventor contemplates a vocal mode or a blind mode where in addition to the entry of data and navigation of the interface of editing 84 via a sound file, a selection can be made when the website in return send back commands as part of sound. This "blind" more is also called the Alexa® mode where a person could, for example, no-code an App using an Alexa® devices. Below is described only the sound user input system. One of ordinary skill in the art will understand that the navigation from the back-end (i.e. from the Computer is much simpler and does not require the same level of Natural Language Understanding as the machine is able to generate commands from a database directly and does not need to be adapted to the user's understanding.

To better understand, the example of asking and entry the command linked with the entry of a website (www.amazon.com/81056RTF), a Natural Language Understanding interface must be able to understand "load my website at doubleyou doubleyou doubleyou dot amazon dot come slash beetenfiftysixrtf" or for example "connect amazon dot com forward slash b one zero five six r tf" as certain people will pronounce the world wide web letters and others will not. In the above example, certain individuals call a forward slash as simply a slash and also will read out numbers by digit or in pair (one zero v. ten) to help. In the above example, the natural language understanding module engine will understand and translate to the database to add the website as written or would be typed. But on the other side, if the system wants to read to a user, in a blind mode, the computer will have only a single way to read out the website from the database (e.g. "should we add your website at doubleyou doubleyou doubleyou dot amazon dot com forward slash B ten fifty-six RTF?).

Figure 6:
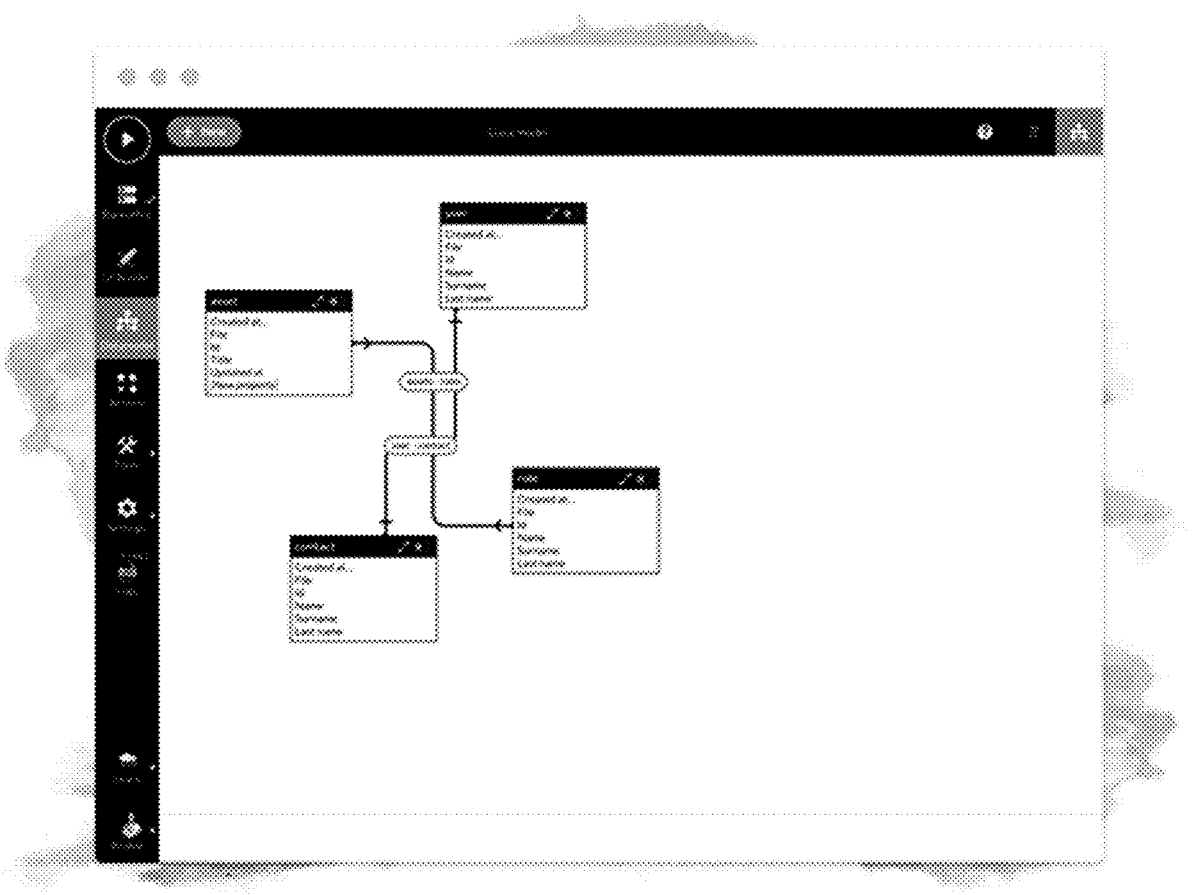
FIG. 6 is a diagram of functional pieces linked with each page of an App under development according to an embodiment of the present disclosure.

NCDPs are often designed with line of business users in mind as opposed to traditional information technology In some instances, one of many User Interface Builder (UIB) can be used as shown at FIG. 6 to represent logically the different pages of the App as they are unfolded and logically connected. In this illustration pages are given titles and connected to each other via some types of logic feature (e.g. click, select, push). Each piece of this puzzle in the UIB can be given a role, a contact, an asset, or even a user. To the inventor, the use of "features" is often optimized to help each page operate and offer a single functionality. Such tools allows a person to see and execute directly how the App unfold. In some cases a software like JS Framework® will increase visibility. In this phase, while a person will not know how to program the App, a degree of sophistication with the UIB is required to manage this simpler interface. In a subsequent stage, using a "drag and drop" interface, a person may be able to see a series of tools that will quickly allow for adding features and functionalities in an "a la carte" process. While the above is not direct coding, it does offer functions that are not to me understood.

Suggested No-Code App

As shown at FIG. 5, element 83, as part of the initial App template selector, the inventor offers the following preliminary steps:

Step 1: Enter Name of Business

Step 2: Chose a Category Which Fits Best (Business, Online Store, Religion/Worship, Location & Place, Radio/Podcast, Events/Health & Wellness, Dating, Restaurant & Food, Education, News & Magazine, Others). To the Inventor, each category is associated with a Template which offers and selects certain key features generally associated with this template.

Step 3: Color Scheme (Light/Dark), then a selection of a handful of motives (Deep Ocean, Go Green, Cheerful Cherry, Dynamic Sunburst, Carbon Mystique, Techno Grey). In this third step, the no-code programmer simply creates an overall scheme. The inventor understands that often, in the world of Apps, a user will have in his/her mind some type of general idea of what the App will look and feel like. Once again, the above is associated with Template technology which is then coordinated with Step 2 Template to further drill down complex menus stored in databases.

Following steps include, Step 4: Select Operating System (Android® or iPHone®), Step 5: Create an Account (With email, password and validation), Step 6: Email verified by system., Step 7: Customize of fonts and colors with heater, layout, and page selection code, Step 8: Customize App layout in background (Choice of 20), give layout setting to hide borders, hide background, hide text, semi rounded, show banner, Step 9: Customize App Elements like the App Icon, the App Background, the App Splash Screen, Step 10: Naming of App, Step 11: System Generates App, Step 12: Email notifications and online Chat to help, Step 13: QR Code generated for scanning of user phone (Other ways to get App software is email, message (text) or URL link, Step 13.1: Testflight Apple, for upload—Get TestFlight, Step 13.2: Join Beta to test using TestFLight®, Step 13.3: Return to HTML Browser page, Step 13.4: Enter Invitation Code. In the above, the interface instead of asking a programmer to code these features, different user-friendly interfaces are given.

The above (83 at FIG. 5) is designed to generate a basic App template from which the Edit module (84 at FIG. 5). In the above steps, a third party App (TestFlight®) is used and uploaded on a person's cell phone from the App store to help manage certain tools. Ultimately the inventor believes the process for further simplification will incorporate all functions and tools as part of a single App.

Figure 7:
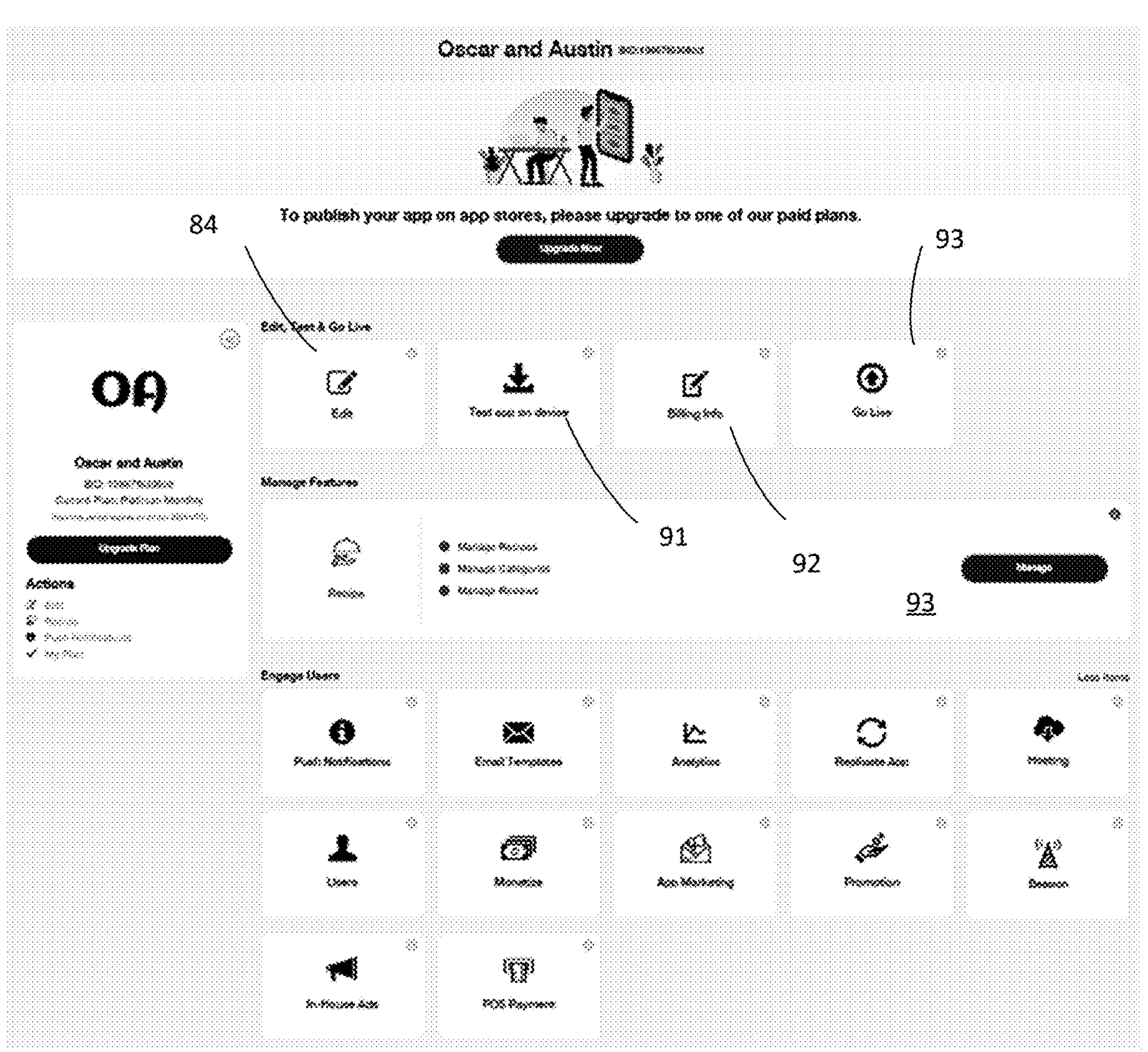
FIG. 7 is a screen print out of a non-aural user interface for the no-code programming of Apps according to an embodiment of the present disclosure.

FIG. 5, element 83 and element 82 is shown with greater detail at FIG. 7 from one configuration of the website for coding no-code with NLU interface. First, the edit module 84 of FIG. 5 is represented also at FIG. 8 but is shown as 84 on FIG. 7 for continuity. Includes Edit 84, a Test App on Device 91 which allows for the local execution of the App on a cell phone via direct execution on a test device or via a third-party App to help manage a temporary upload and download as suggested at FIG. 3. Next, the interface offers economical client-related billing info 92, and finally a "Go Live" feature 93 as part of main features. This feature 93 allows for the final transfer 69 to the App Store Interface 67 for installation 70 on the local device 62 as shown at FIG. 4. It is important to note that as part of this "Go Live" feature, many additional data and functions must be implemented to release the App in this final way.

In the middle of FIG. 7 is a management tool for "features" which is one high level of templating which allows the no-code to function 94. Below in the interface are secondary features to engage users which include, Push Notifications, Email Templates, Analytics, Replicate App, Hosting, Users, Monetize, App Marketing, Promotions, In-House Ads, POS Payment, and Beacon. Below, what is described is the use of Natural Language Understanding and associated software engines linked primarily with the Edit tool 84 which is of primary concern to help no-code programming. One of ordinary skill in the art will understand that such logic and use of NLU can and will be applied to other features of the interface and features shown at FIG. 7.

As part of the email templates, the user is offered a list of templates, identifier for each and date updated and button (edit/view). These emails include: Account reactivation to user, account deactivation to user, account deletion, App user file upload, OTP Email, Account password reset, etc.

Hosting includes files for interface for each registered user: (i) users, (ii) group, (iii) settings, (iv) registered user, (v) user registration API, (vi) user update API, and (v) IAP. This is shown at FIG. 10 where a person in addition to editing the App can also manage users and groups related thereto. At FIG. 11 is shown one possible interface of App marketing. App Marketing, includes email credit system. Dashboard offered that allows to market and create multiple emails via purchase of email credits, import of address book. Offer Facebook post, Twitter post, URL for sharing or the design of a landing page for those who do the above.

Returning to FIG. 10, what is shown is the CVS tab for example. The API and IAP tabs are shown with greater detail or structure at FIGS. 12-14.

The user update API includes the functions, (a) Key, (b) Parameters [API Key & Email Required], Name, Password, Phone, Group, Password type, (c) API Response codes and description, (d) HTTP POST Sample Code PHP, HTTP POST Sample Code (Ajax). Both XML Request and JSON Request. The User Registration API is almost the same as User Update API except the email/password are required and in the API codes, Codes 2033 (Name is Required), 2034 (Email is required), 2035 (Password is required). Register user has both a manual system (Full name, Email and Phone number) and the upload of a CSV file (either download sample file offered or upload Cvs file.

App Users settings include (a) Configuration settings that includes (i) Registry, (ii) Auto Approval, (iii) Email verification, (iv) Authorized Email, (v) Notification on Approval, (vi) Notification on CSV Upload, (vii) Delete email notification, (viii) LDAP Authentication, (ix) Device login limit, (x) Lock my files area, (xi) File upload notification, (xii) Phone number with country code. App Users settings include (b) mail chimp email settings that include the API Key, Audience id, and the email. App Users phone notification settings include: (c) Phone verification button, SMS Accound SID, Auth Token, From Number, and draft SMS text message (e.g. Thanks for registration on _APPNAME_ app. Your verification code is _CODE_). Sample Code is offered both for a JSON and HML request. FIGS. 12-16 show the different codes to be created linked with API codes and responses.

FIG. 13 is a HTTP Post sample code for PHP for Json Request, while FIG. 14 is a HTTP Post sample code PHP but for XML Request. In contrast, the HTTP Post sample Code (Ajax) for XML Request is offered at FIG. 15 and the HTTP Post sample code (AJAX) for Json is offered at FIG. 16.

Figure 8:
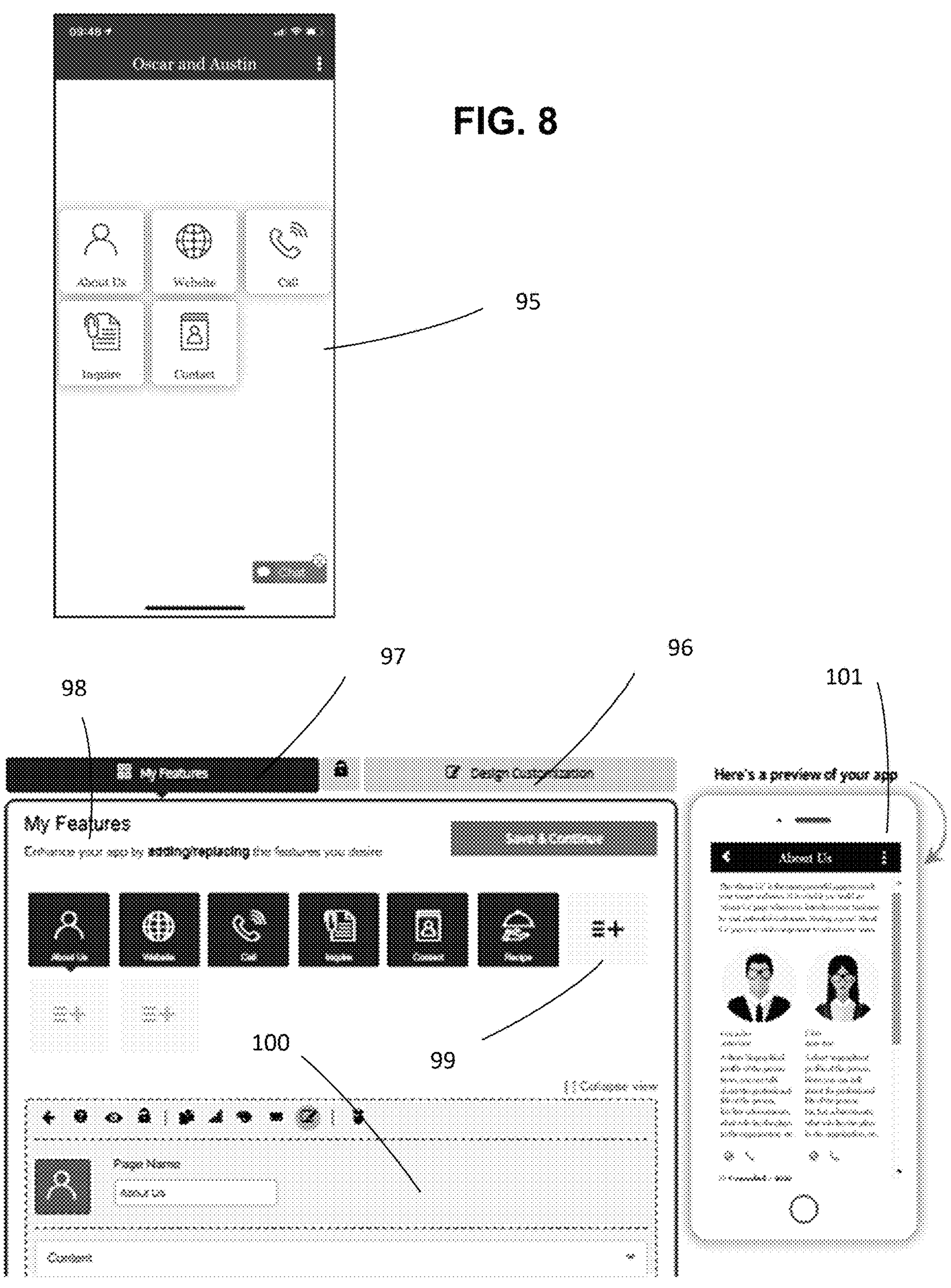
FIG. 8 is a draft view of a sample App generated for pre-review having been produced and sent to the App store based on a first set of templates according to an embodiment of the present disclosure.
Figure 17:
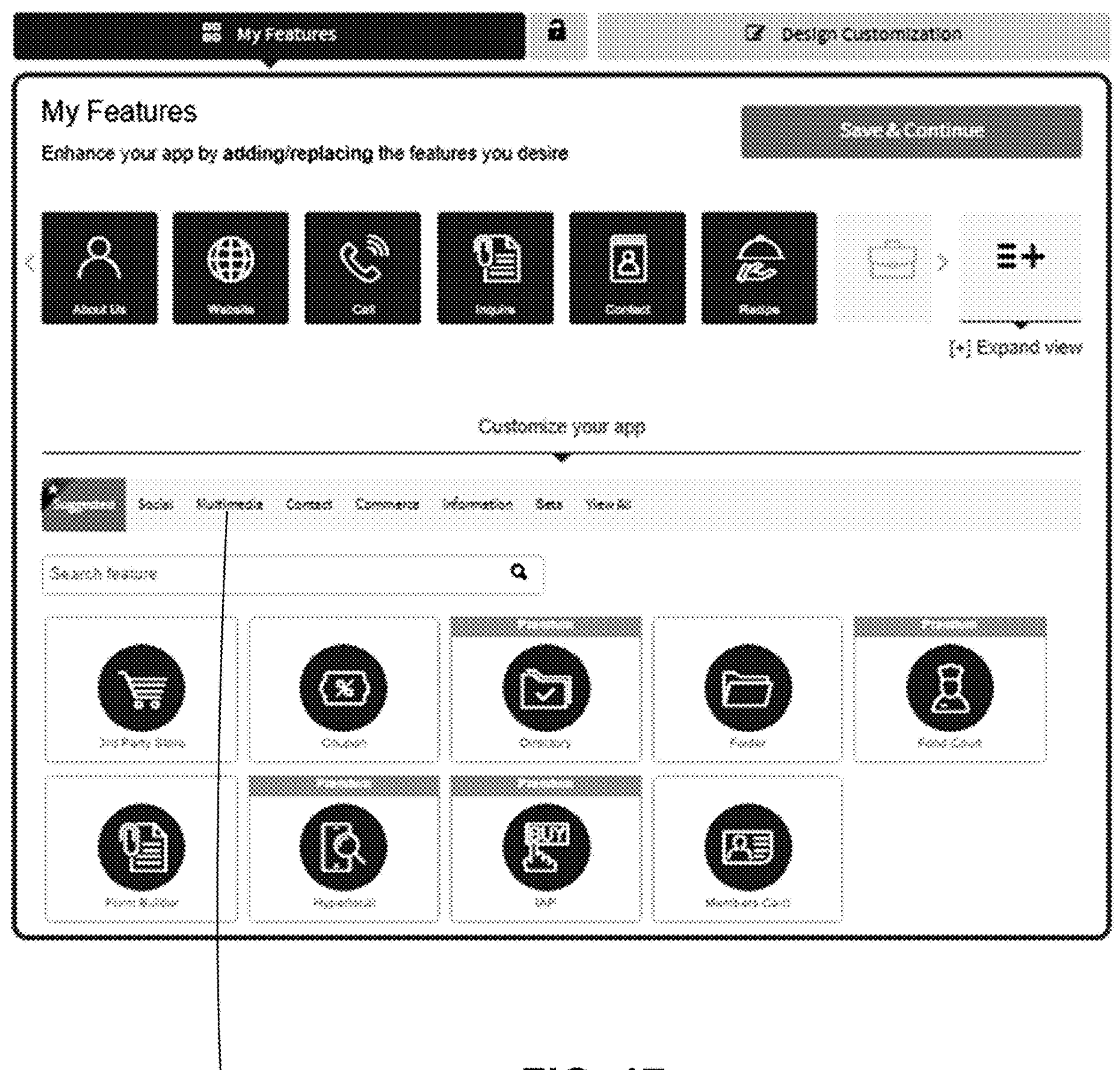
FIG. 17 is a screen shot of the list of features structured in groups for the editing of an App using no-code and NLU technology according to an embodiment of the present disclosure.

FIG. 8 illustrates, for example, the naked templated selective choices resulting from the initial 83 from FIG. 5 selection of core templates from simplified first sets. As shown, five "features" 95 have been pre-selected to help a user see the basic features linked with the type of menu selection. As shown, this final view allows a person to get instantly familiarized with the overall App programming process. As part of the Edit tool 84 from FIG. 5, one possible navigational tool is offered at FIG. 9.

As shown at FIG. 9, the Edit tool lists as shown the icons 95 shown at FIG. 8 and pre-selected using the template. On the right, the design function 96 allows Entry of design interface. This interface includes a design customization on basic features like color theme, customized fonts and colors, customize app layout from list of templates, and customize App elements. Part of the NLU system allows to manage both the My Features 97 portion and the Design Customization 96.

The engine who modulates the engines of each feature, is programmed to break down each into simple and easy to use tools for users who have no experience in coding. For example, the webpage has tools that include (i) top icons of general navigation, then (ii) a simple iconography and title for entry of simple information, (iii) a content box designed to be customized and finally (iv) advanced settings. Each feature page includes tools like draft numbering (e.g. 999-999-9999 when a phone number must be entered and "phone" in the box where the phone number must entered.)

As shown at FIG. 9, the first box is a My Features 98 section which includes every icon pre-selected and displayed at FIG. 8. As shown section 98 is designed to help manage the new App using this feature menu 99 that allows quick access to any one of these features to be illustrated below at 100. To the right is a live preview of the page 101 on the App that displays the feature as the pop-up fields below 100 are entered. This allows for simpler programming interface.

As the tools grew in power and functionality, new features are added. As shown, indexing of features can be done by groups 102 (i.e. Suggested, Social, Multimedia, Contact, Commerce, Information, Beta, and View All). Some of these features can be offered in additional package or as part of advanced tools.

Figure 18:
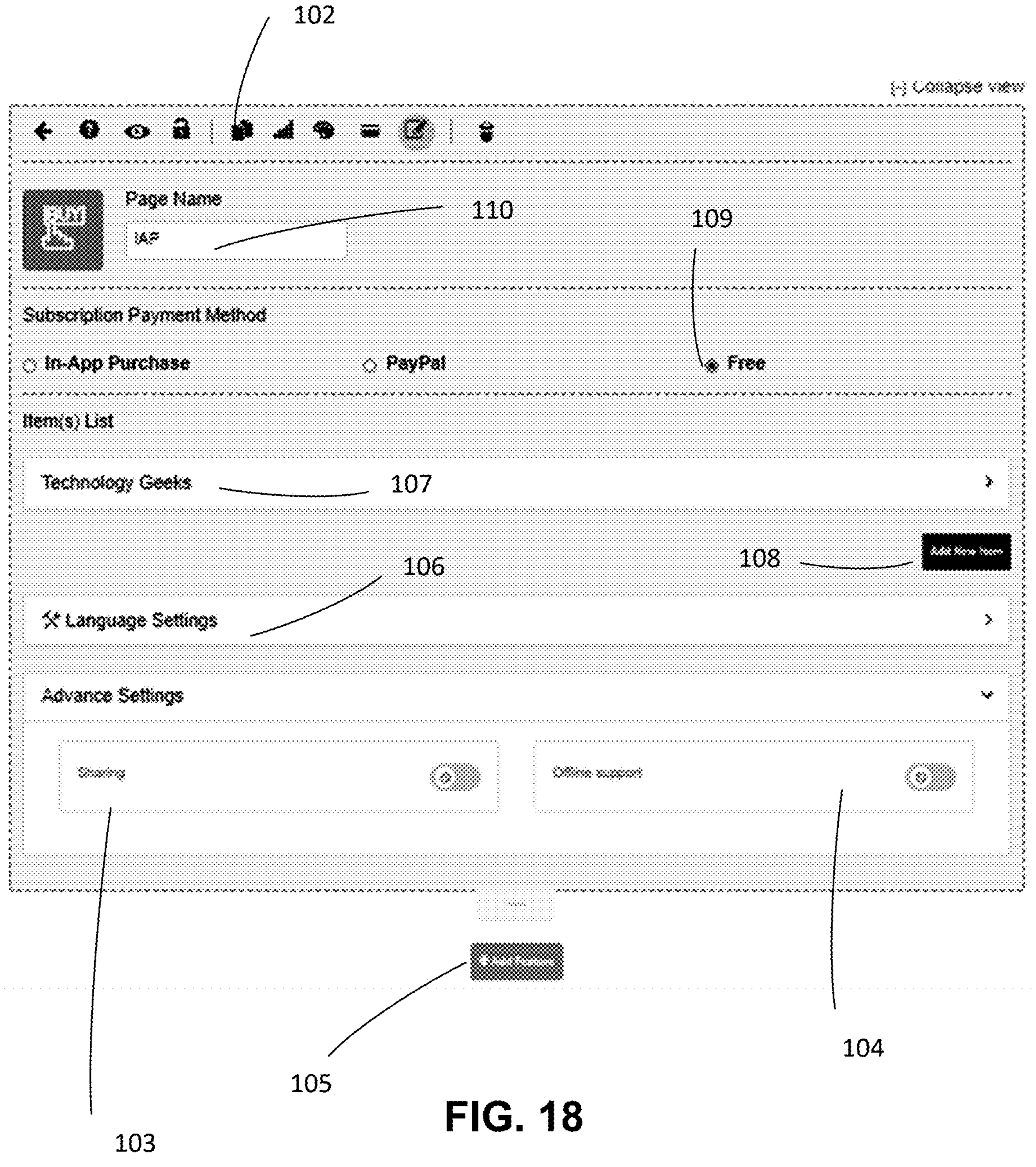
FIG. 18 is a screen shot of a sample feature page as part of the editing module of FIG. 17 according to an embodiment of the present disclosure.

Multiple new features are offered and for example, one is named IAP (In-App Purchase) illustrated as FIG. 18. Each new feature includes an interface with a series of icons 102, as shown navigational tools like (a) back, (b) tutorial, (c) enable login, (d) copy page/URL, (e) on page SEO, (f) layout and color schemes, (g) IAP settings, (h) enabled shown edit table, and (i) basket.

Figure 19:
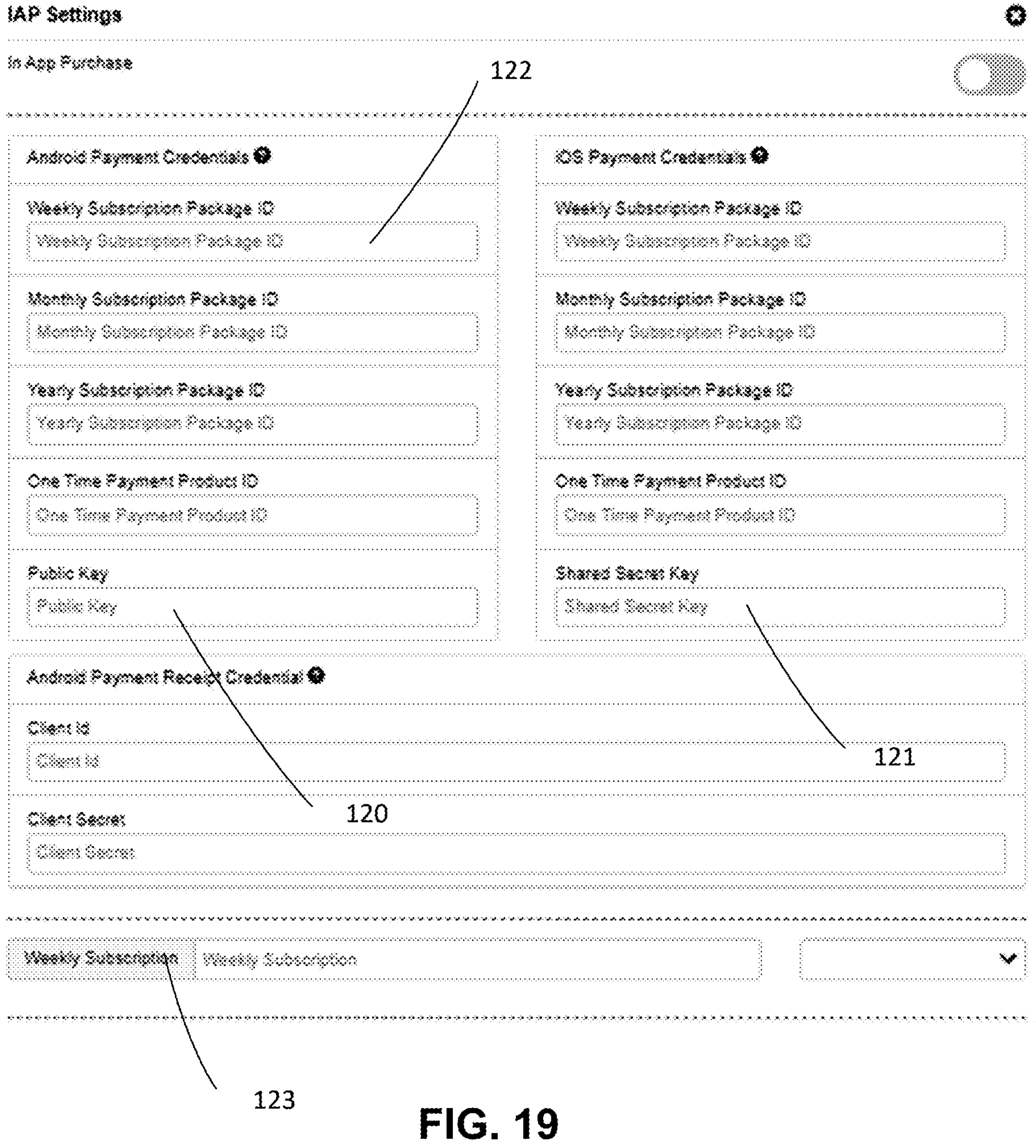
FIG. 19 is a screen shot of the IAP Setting page of one feature of the group for editing shown at FIG. 18 according to an embodiment of the present disclosure.

As shown at FIG. 19, an illustration of this specific IAP selection. The IAP Settings include an in App Purchase button, Android Payment Credentials or iOS payment credentials (Weekly, Monthly, Yearly, One Time Payment) and both a Public Key and a Shared Secret Key. Also added are Android® payment receipt credential (Client ID, Client Secret).

Figure 24:
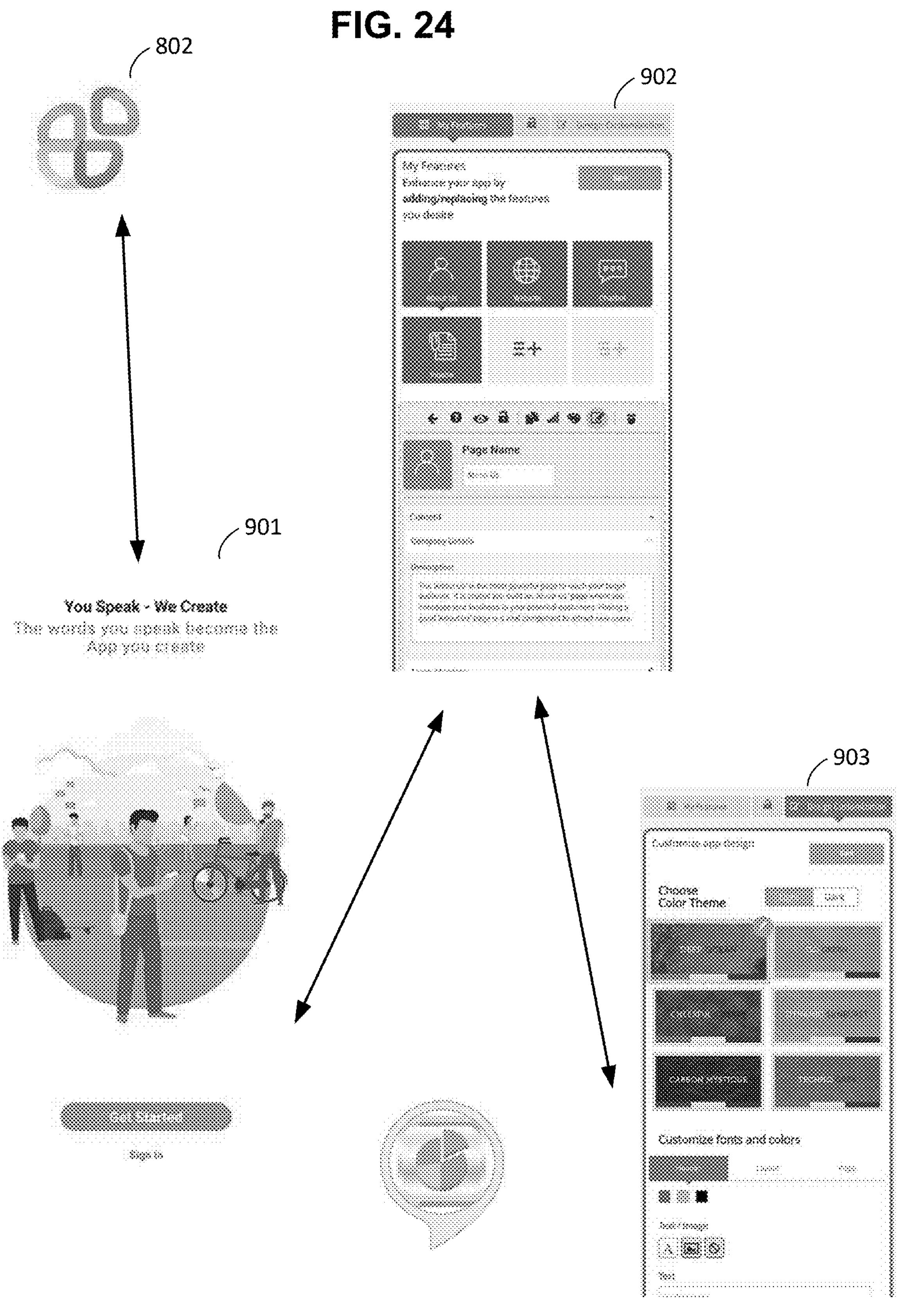
FIG. 24 is an illustration of some pages of the no-code coding App used to create a no-code coding App Product with the current NLU-based Engine.

FIG. 23 illustrates a handful of screens linked with an App 802 which is designed to replace the website with no-code coding. As shown at 901, 902 and 903, all of the features and functions of the ordinary website can easily be recaptured, displayed on the App. For example, FIG. 9 shows the edit module on the website while 902 of FIG. 24 illustrates the same general functions.

In contrast, the voice activated module 803 as shown at FIG. 23 is often designed to operate "blind" and only orally using the microphone and speaker functions of a device. Instead of showing the images of FIG. 23, the App would use scripts created and generated by the device. For example, the script would be:

Introduction: Make an App, As Easy as Pie!

Content Question Spoken: What would you like to name your App? Responsive string for parameter A.

Content Question Spoke: Please tell me what type of App you want to create? Responsive string looking for parameter B.

Where the responsive string can be bollean (yes or no) or also be phrased as part of a string of answers (do you need type a, type b, type c, etc.). The system uses NLE to manage the responsive string. This tool includes, for example a system which recognizes exit terminology or expressions used to back up of commands. For example if a user is prompted for parameter B but instead says "I don't understand" or "What?" The system is programmed to have a repeat function of the previous content question spoken. Commands like "I am tired" or "can we stop" would be prompted for exit logic.

The Artificial Intelligence Engine

Figure 20:
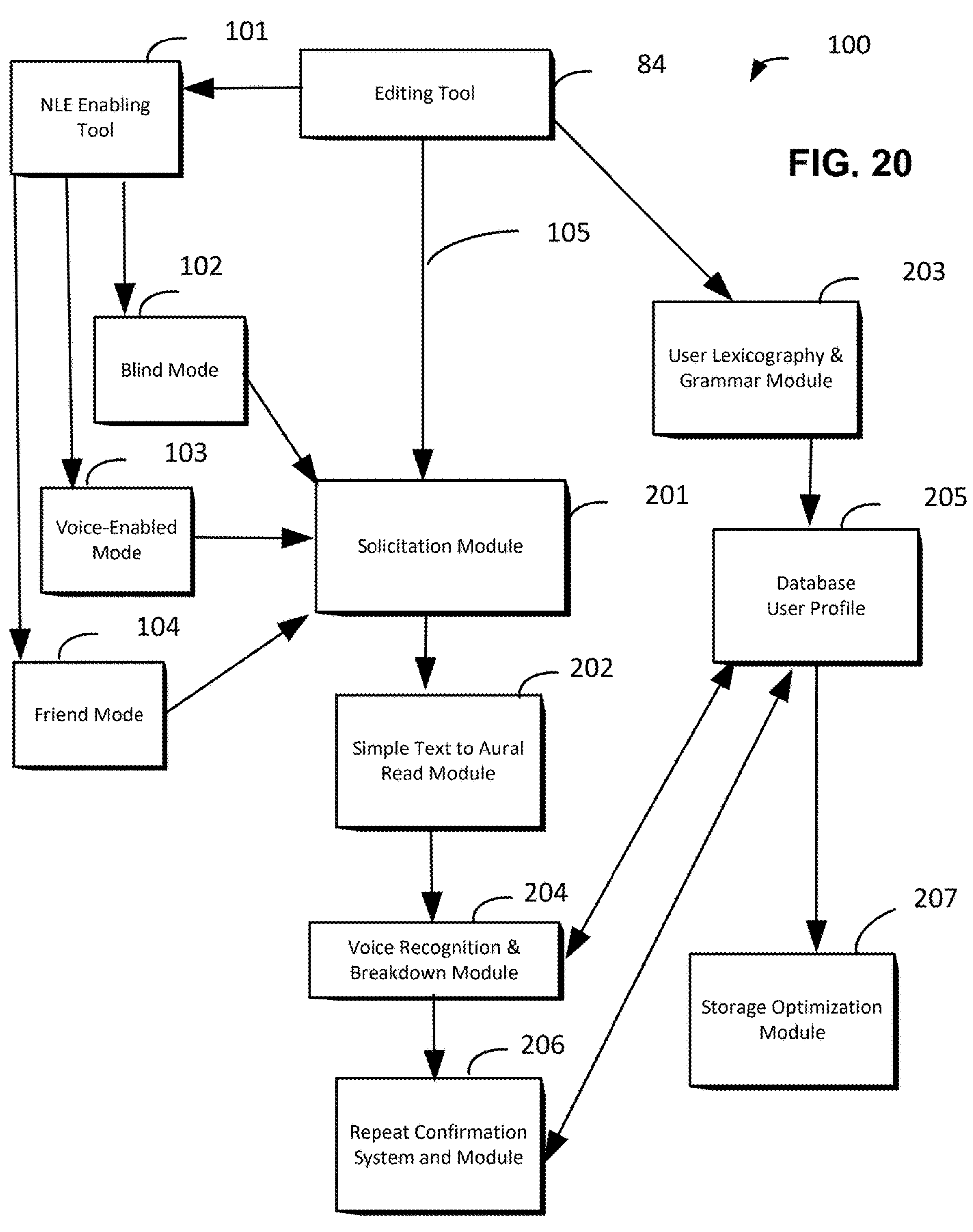
FIG. 20 is a figure illustrating the modules linked with a no-code NLU-based Engine for the platform and system for the automated no-code coding of App-software using conversational interface based on natural language understanding/processing and method of use thereof.

As shown at FIG. 5 element 86, the editing tool generally described as 84 at FIG. 7 and shown with greater detail at FIGS. 9-19. The inventor has invented a set of features, shown at FIG. 20 which allows the system described and shown above to receive voice instructions from a user over a microphone 61 as shown at FIG. 3, and by using artificial intelligence which is funded on Natural Language Understanding and logic, and an Artificial Intelligence Engine allows for a user to select a mode using a NLE Enabling Tool 101. As part of this tool, three modes are offered, a fully aural 102 (i.e. the "blind" mode) where the editing tool sends aural information using a microphone 61 at FIG. 3 and receives aural instructions back from the user with a speaker 49 at FIG. 3 to manage the programming. A second mode, a semi aural mode 103 (i.e. called "Voice-Enabled" mode) allows a user to enter both textual using a normal keyboard but also using aural information into the edit module 84, and a simple guide mode 103 (i.e. called the "Friend" mode) which allows a user to simply use help and automated communications.

As part of these three modes, the system requires input processing of .wav or other format sound files for processing internally.

Next, the system 100 is designed with a Solicitation Module 201 which allows a user to be guided into pure Edit 105, the Blind mode 102, the Voice-Enabled 103 mode, or the Friend 104 mode. This solicitation module 201 prompts by using a speaker 49 on the system and reading certain key elements of the Edit module 84. The inventor has determined that to increase the efficiency of the vocal input from a user, by suggesting key terminology to a user and when offering menus, a user will be guided in the structure of how it enters commands into the system for one of many modes.

For example, a non-prompted user who may want to add a "call button" to his/her App shown as the third button from the list of features 98 in the display of FIG. 9, a person could say "add a phone call" or "we need a way for the user to call us." In both these cases, the NLU module would have to work harder to transfer this to "add 'call' function from my features choices to my features on main menu." As a way to 'educate' the user, by using Solicitation Module 201, used to voice the visual—non-aural elements, the Solicitation Module 201 is programmed to read key words the system that may for example already be displayed like: "Enhance your app by adding the feature you desire such as a about us, website, call, etc." The Solicitation Module 201 would simply be programmed to use a Text To Aural 202 Module which simply reads the page programmed normally the no-code author.

The inventor also has determined that by using a Text-To-Aural 202 module, the creation of additional features and new features is driven by the normal textual way of programming a no-code additional feature instead of having to reprogram how the system communicates with a user.

Next, the inventor to speed up the process and quickly allow the system to avoid the use of Text-To-Aural 202 and Solicitation Module 201, the system has a User Lexicography & Grammar Module 203 which over time will learn and index the preferred Lexicography and Grammar of a specific user after the voice is recognized and associated with a single user after a Voice Recognition Module 204. The system also stores and updates in a database 205 the user profile from the Voice Recognition Module 204 and that information is located next to all of the NLU system.

The NLU Engine 100 also includes a repeat and confirmation system where a person can be asked to confirm if the system has properly understood and translated the natural language into terminology that aligns with the database. For example, if a person says "we need a call button" the system having analyzed using the NLU process and indexing a database can repeat using the repeat confirmation system 206 "do you mean add the call feature?" where the term "add" and "call feature" are actions in the database.

The NLU Engine 100 also includes a Storage Optimization System 207 which is designed to index and store relevant tools for the Voice Recognition Module 204 linked to a user and also store either some voice pieces or the relevant key indexed database codes confirmed by the Confirmation System 206. Such a system allows for the NLU Engine to learn about the user about key words and if a user has already confirmed that "we need a call button" means "add the call feature" the system will understand the term "button" may signal an action or a feature under the way the system is created and the database is indexed. This self-learning tool will help the automated process to become simpler and more dynamic over time by the interaction.

The system allows for the entry of similar commands as the Edit module and results in the same App being created. Once again, while such aural system and NLU systems can be used by those who have vision, very often their design is best optimized by thinking the tools offered should be so autonomous as to be able to allow a person without sight to program the App. In such cases, as seen in FIG. 9, element 101 a preview of the App is displayed.

The Inventor discloses the feature where instead of acting as a purely voice or text interface, a person may enhance a text entry with voice. As part of this dual mode, a user is given enhanced functionality. In the Voice-Enabled Mode 103, the person using the interface to enable this dual mode using a button. This mode is rather similar from the above mode in that the Voice Recognition Module 204 is the same and works in tandem with normal editing interface mode. There is no need for a Solicitation Module 201 or a speech out to user module. For example, the system may recognize if a person has clicked into any data entry field (e.g. page name) and while a cursor appears, a person may talk in the microphone who instead of indexing the database after a NLU analysis, certain terms may be dictated directly.

This system also can be programmed for the voice to directly be translated to text into a chat/help mode to the user as a Friend 104 mode. The NLU program is given enhanced command modes and key terms like "open" or "go to" as navigation tools.

As described above, the inventor has invented a new, non-obvious and not abstract system for the automated no-code coding of an App Software Product using a conversational interface based on natural language understanding (NLU), the system comprising at least one user personal computer acting as a local device having at least a first computer processor, a first computer memory for executing an HTLM browsing software and executing an App-based software in the first computer memory by the first computer processor, a first connection to a network for connecting to a remote device and an App Store possibly on the remote device for access to a plurality of Apps stored in the App Store and access to a no-code coding website or a no-code coding App with at least an Editing Module (EM) for programming a no-code App Software Product, the user personal computer acting as the local device with at least a speaker and a microphone for processing aural requests from the user at the local device to the no-code coding website or the no-code coding App at the second device or the first device and, the user personal computer also including a first computer display or visual interface connected to the user personal computer for interfacing with the user and display elements of the EM for the no-code coding of the App Software Product, at least the remote device as a second computer for hosting the no-code coding website or the no-code coding App with the EM for programming the no-code App Product with at least a second computer processor, a second computer memory for executing software in the second computer memory by the second computer processor such as the no-code coding website, or at least the local device as the first computer for hosting the no-code coding App with the EM for programming the no-code coding App Software Product, the EM and a Natural-Language Editing (NLE) Module, the remote device as the second computer network connection to the network and the first computer, wherein the software in the second computer processor for the no-code coding of an App or the first computer processor for the no-code coding of the App generates a App Software Product for storage on an App Store using the EM and the NLE Modules; and at least one interface on the local device for the access to the App Store Interface for uploading and installation locally of the App Software Product generated by the no-code coding website or the no-code coding App with NLE Module, and wherein, the NLE Module includes at least a Natural Language Engine (NLE) enabling tool, a Voice Recognition and Breakdown (VRB) Module using NLU tools, and a database.

Also, the inventor has also invented how the above system where the NLE Module includes a Blind Mode, a Voice- Enabled Mode, and a Friend Mode for the entry by the user in the microphone of aural data for pre-processing by VRB Module and sent to the NLE Module, wherein the NLE Module further includes a Solicitation Module connected to a Simple Text to Aural Read Module for reading to the user part of the no-code coding website or the no-code coding App for soliciting back aural data, further comprising a VRB Module using NLU for transforming voice from the user in either the Blind Mode, the Voice-Enabled Mode or the Friend Mode for use by the system, wherein the voice transformed from the user using the NLU is processed by comparing the calculated commands with the database of actions and functions available for editing using the EM, wherein a Repeat and Confirmation System Module is used to further enhance the efficiency of the VRB Module, wherein a User Lexicography and Grammar Module is used to further enhance the efficiency of the Voice Recognition & Breakdown Module, wherein a Storage Optimization Module is used to optimize the storage of user profile and data, wherein the system is limited to the use in the context of an EM for the creation of an App broken down along features each having at least one editing field for entry of information using one of the three modes of aural data entry, wherein the system includes at least one API coding chart and associated HTTP Sample code under either of XML and Json format, wherein the EM further includes at least one new In App Purchase Feature for the inclusion of the feature into the App for production using the no-code coding website and associated Natural Language Understanding interface, wherein the In App Purchase includes at least one field of subscription payment method, a language setting, advance settings and programming of a public key and/or a shared secret key alongside payment credential sectors.

As shown at FIG. 21, the inventor also contemplates that the above system and platform results in multiple new methods being made possible. For example, the method 400 operation and use of a system for the automated no-code coding of App-software Products using conversational interfaces based on Natural Language Understanding (NLU), the method comprising the steps of: allowing 401 a user to connect using a personal computer acting as local device with at least a first computer processor, a first computer memory for executing HTLM browsing software and App execution software in the first computer memory by the first computer processor via a first connection to a network for connecting to a remote device for access to an no-code coding website or a no-code coding App with at least an Editing Module (EM) for programming a no-code App, with at least a speaker and a microphone for receiving aural requests of a user and sending aural content to the no-code coding website or the no-code coding App, a first computer display and visual interface connected to the user personal computer for interfacing with the user and display elements of the EM for the no-code coding of the App Software Product, initiating 402 the no-code coding of the no-code App using the EM on the remote device with the no-code coding with at least a second computer processor, a second computer memory for executing software in the second computer memory by the second computer processor such as the no-code coding website, or at least the local device as the first computer for hosting the no-code coding App with the EM for programming the no-code coding App Software Product, the EM using at least a Natural-Language Editing (NLE) Module, wherein, the NLE Module includes at least a Natural Language Engine for enabling tool, a Voice Recognition & Breakdown Module using Natural Language Understanding tools, and a database, and the remote device as the second computer network connection to the network and the first computer, wherein the software in the second computer processors for the no-code coding of an App generates a App Software Product for storage on an App Store, enabling 403 on the EM for voice entry by the user, using 404 the NLE Module for recording the user aural content, processing the voice into a set of commands for use by the EM for programming the App Software using the no-code coding; generating 405 by the EM the App Software partly relying on the NLU, and allowing 406 the no-code coding website or no-code coding App for sending the App Software Product to the App Store for uploading In other methods, the inventor has invented wherein the NLE enabling tool includes a Blind Mode, a Voice-Enabled Mode, and a Friend Mode, and the method further includes the step of allowing 407 the user to select between each of these three modes for pre-processing by VRB Module and sent to the NLE Module of voice of the user, wherein the NLE Module further includes a Solicitation Module connected to a Simple Text to Aural Read Module, and the method further includes the step of reading 408 to the user part of the no-code coding website or no-code coding App for soliciting back aural data, the system further comprising a VRB Module using NLU and the method includes the step of transforming 407 voice from the user in either the Blind Mode, the Voice-Enabled Mode or the Friend Mode for use by the system, wherein the voice transformed from the user using the NLU is processed by comparing 409 the calculated commands with the database of actions and functions available for editing using the EM, and further comprising the step of a Repeat and Confirmation System Module is used 410 to further enhance the efficiency of the VRB Module.

Also, the conversational interface executes the conversation from the external database by mapping the natural-language phrases input by the user and the additional natural-language phrases input by the user to corresponding feature set of the app builder, thereby producing a fully functional app that the end user can now test on his device.

What is claimed is:

1. A method for generating an app software product through a conversational interface, the method comprising:
- receiving, via the conversational interface, a user request to create the app software product during a conversational session;
- parsing the user request using a natural language processing (NLP) engine to identify intent and entities;
- generating an app software product based on the identified intent and entities, wherein the generation is performed by a no-code generation module executing on a computing system;
- deploying the app software product to a live environment upon receiving user confirmation; and
- continuously updating the NLP model during the conversational session based on user corrections or confirmations, thereby dynamically improving subsequent intent recognition accuracy.

2. The method of claim 1, further comprising refining NLP model weights or keyword mapping in real time based on user feedback or clarification prompts during the conversational session.

3. The method of claim 1, wherein the conversational interface is configured to operate in a blind mode, a voice-enabled mode, and a friend mode wherein: the blind mode is configured to generate the app software product in response to solely aural data, the voice-enabled mode is configured to generate the app software product in response to text data and aural data, and the friend mode is configured to generate the app software product in response to the user's interactions with automated prompted communications.

4. The method of claim 1, wherein the step of deploying the app software product to a live environment is performed upon receiving the user confirmation via the conversational interface used to create the app software product.

5. The method of claim 1, further comprising confirming features of the app software product with the user via the conversational interface during the conversation session before generating the app software product.

6. A system for generating an app software product through a conversational interface, the system comprising at least one computing device comprising a processor and memory, the system configured to:

receive, via the conversational interface, a user request to create an application during a conversational session;

parse the user request using a natural language processing (NLP) engine to identify intent and entities;

generate an app software product based on the identified intent and entities, wherein the generation is performed by a no-code generation module executing on the at least one computing device;

deploy the app software product to a live environment upon receiving user confirmation; and continuously update the NLP model during the conversational session based on user corrections or confirmations, thereby dynamically improving subsequent intent recognition accuracy.

7. The system of claim 1, wherein the system is further configured to refine NLP model weights or keyword mapping in real time based on user feedback or clarification prompts during the conversational session.

8. The system of claim 6, wherein the conversational interface is configured to operate in a blind mode, a voice-enabled mode, and a friend mode wherein:

the blind mode is configured to generate the app software product in response to solely aural data, the voice-enabled mode is configured to generate the app software product in response to text data and aural data, and the friend mode is configured to generate the app software product in response to the user's interactions with automated prompted communications.

9. The system of claim 6, wherein the app software product is deployed to a live environment upon receiving the user confirmation via the conversational interface used to create the app software product.

10. The system of claim 6, wherein the system is further configured to confirm features of the app software product with the user via the conversational interface during the conversation session before generating the app software product.

* * * * *